(12) United States Patent
Manamohan et al.

(10) Patent No.: US 11,876,891 B2
(45) Date of Patent: *Jan. 16, 2024

(54) SECURE PARAMETER MERGING USING HOMOMORPHIC ENCRYPTION FOR SWARM LEARNING

(71) Applicant: Hewlett Packard Enterprise Development LP, Houston, TX (US)

(72) Inventors: Sathyanarayanan Manamohan, Karnataka (IN); Vishesh Garg, Karnataka (IN); Krishnaprasad Lingadahalli Shastry, Karnataka (IN); Saikat Mukherjee, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/533,595

(22) Filed: Nov. 23, 2021

(65) Prior Publication Data

US 2022/0085975 A1 Mar. 17, 2022

Related U.S. Application Data

(63) Continuation of application No. 16/773,555, filed on Jan. 27, 2020, now Pat. No. 11,218,293.

(51) Int. Cl.
*H04L 29/06* (2006.01)
*H04L 9/06* (2006.01)
(Continued)

(52) U.S. Cl.
CPC .......... *H04L 9/0637* (2013.01); *G06F 21/602* (2013.01); *G06N 20/20* (2019.01);
(Continued)

(58) Field of Classification Search
None
See application file for complete search history.

(56) References Cited

U.S. PATENT DOCUMENTS 9,413,779 B2 8/2016 Vasseur et al.
9,569,517 B1 2/2017 Smola et al.
(Continued)

FOREIGN PATENT DOCUMENTS

AU 2017100968 A4 9/2017
CN 105488675 A 4/2016
(Continued)

OTHER PUBLICATIONS

"Decentralized Machine Learning White Pape"r, available online at <www.decentralizedml.com>, Dec. 31, 2017, 58 pages.
(Continued)

*Primary Examiner* — Andrew J Steinle
(74) *Attorney, Agent, or Firm* — Hewlett Packard Enterprise Patent Department

(57) ABSTRACT

Systems and methods are provided for implementing swarm learning while using blockchain technology and election/voting mechanisms to ensure data privacy. Nodes may train local instances of a machine learning model using local data, from which parameters are derived or extracted. Those parameters may be encrypted and persisted until a merge leader is elected that can merge the parameters using a public key generated by an external key manager. A decryptor that is not the merge leader can be elected to decrypt the merged parameter using a corresponding private key, and the decrypted merged parameter can then be shared amongst the nodes, and applied to their local models. This process can be repeated until a desired level of learning has been achieved.

(Continued)

The public and private keys are never revealed to the same node, and may be permanently discarded after use to further ensure privacy.

15 Claims, 15 Drawing Sheets

(51) Int. Cl.
| | | |
|---|---|---|
| H04L 9/30 | (2006.01) | |
| H04L 9/00 | (2022.01) | |
| G06F 21/60 | (2013.01) | |
| G06N 20/20 | (2019.01) | |
| H04L 9/08 | (2006.01) | |

(52) U.S. Cl.
CPC ............ *H04L 9/008* (2013.01); *H04L 9/0819* (2013.01); *H04L 9/30* (2013.01); *H04L 9/50* (2022.05)

(56) References Cited

U.S. PATENT DOCUMENTS

| | | | |
|---|---|---|---|
| 9,633,315 | B2 | 4/2017 | Chapelle et al. |
| 9,779,557 | B2 | 10/2017 | Hauser et al. |
| 9,875,510 | B1* | 1/2018 | Kasper .................. G06Q 40/12 |
| 10,057,243 | B1 | 8/2018 | Kumar et al. |
| 10,360,500 | B2 | 7/2019 | Kabul et al. |
| 10,547,679 | B1 | 1/2020 | Burnett et al. |
| 10,671,435 | B1 | 6/2020 | Gold et al. |
| 11,201,747 | B2 | 12/2021 | Scherrer et al. |
| 11,334,817 | B2 | 5/2022 | Wang et al. |
| 2012/0039473 | A1 | 2/2012 | Gentry et al. |
| 2013/0290223 | A1 | 10/2013 | Chapelle et al. |
| 2015/0193697 | A1 | 7/2015 | Vasseur et al. |
| 2015/0324690 | A1 | 11/2015 | Chilimbi et al. |
| 2015/0332283 | A1 | 11/2015 | Witchey |
| 2016/0087854 | A1 | 3/2016 | Jayanti et al. |
| 2016/0179835 | A1 | 6/2016 | Mika et al. |
| 2016/0217388 | A1 | 7/2016 | Okanohara et al. |
| 2016/0261690 | A1 | 9/2016 | Ford |
| 2016/0335533 | A1 | 11/2016 | Davis et al. |
| 2017/0060988 | A1 | 3/2017 | Kudo et al. |
| 2017/0091397 | A1 | 3/2017 | Shah |
| 2017/0103468 | A1 | 4/2017 | Orsini et al. |
| 2017/0116693 | A1 | 4/2017 | Rae et al. |
| 2017/0134158 | A1 | 5/2017 | Pasol et al. |
| 2017/0140145 | A1 | 5/2017 | Shah |
| 2017/0169358 | A1 | 6/2017 | Choi et al. |
| 2017/0220949 | A1 | 8/2017 | Feng et al. |
| 2017/0272342 | A1 | 9/2017 | Zessin et al. |
| 2017/0279774 | A1 | 9/2017 | Booz et al. |
| 2017/0289111 | A1 | 10/2017 | Voell et al. |
| 2017/0302663 | A1 | 10/2017 | Nainar et al. |
| 2018/0018590 | A1 | 1/2018 | Szeto et al. |
| 2018/0039667 | A1 | 2/2018 | Pierce et al. |
| 2018/0157688 | A1 | 6/2018 | Zessin et al. |
| 2018/0183768 | A1 | 6/2018 | Lobban et al. |
| 2018/0217905 | A1 | 8/2018 | Reza et al. |
| 2018/0247191 | A1 | 8/2018 | Katz et al. |
| 2018/0331897 | A1 | 11/2018 | Zhang et al. |
| 2019/0020629 | A1 | 1/2019 | Baird et al. |
| 2019/0042407 | A1 | 2/2019 | Gao et al. |
| 2019/0089716 | A1 | 3/2019 | Carsten |
| 2019/0138929 | A1 | 5/2019 | Wong et al. |
| 2019/0147532 | A1 | 5/2019 | Singh et al. |
| 2019/0182030 | A1 | 6/2019 | Jo |
| 2019/0182231 | A1 | 6/2019 | Harrer et al. |
| 2019/0236598 | A1 | 8/2019 | Padmanabhan |
| 2019/0287026 | A1 | 9/2019 | Calmon et al. |
| 2019/0295000 | A1 | 9/2019 | Candel et al. |
| 2019/0317934 | A1 | 10/2019 | Jentzsch et al. |
| 2019/0325432 | A1 | 10/2019 | Ow et al. |
| 2019/0332921 | A1 | 10/2019 | Rodriguez |
| 2019/0332955 | A1 | 10/2019 | Manamohan et al. |
| 2019/0332966 | A1 | 10/2019 | Gidney |
| 2019/0347540 | A1 | 11/2019 | Yim et al. |
| 2020/0042362 | A1 | 2/2020 | Cui et al. |
| 2020/0057920 | A1 | 2/2020 | Collins et al. |
| 2020/0193292 | A1 | 6/2020 | Weng et al. |
| 2020/0218940 | A1* | 7/2020 | Anglin .................. H04L 9/0637 |
| 2020/0244435 | A1 | 7/2020 | Shpurov et al. |
| 2020/0348662 | A1 | 11/2020 | Cella et al. |
| 2021/0134095 | A1 | 5/2021 | Milt et al. |
| 2023/0041118 | A1 | 2/2023 | Imabayashi et al. |

FOREIGN PATENT DOCUMENTS

| | | | |
|---|---|---|---|
| CN | 106228446 A | 12/2016 | |
| CN | 106445711 A | 2/2017 | |
| CN | 106911513 A | 6/2017 | |
| CN | 107103087 A | 8/2017 | |
| CN | 107332900 A | 11/2017 | |
| CN | 107395349 A | 11/2017 | |
| CN | 107395353 A | 11/2017 | |
| CN | 107579848 A | 1/2018 | |
| CN | 107665154 A | 2/2018 | |
| CN | 108268638 A | 7/2018 | |
| CN | 109033757 A | 12/2018 | |
| CN | 109685501 A | 4/2019 | |
| CN | 109889326 A | 6/2019 | |
| CN | 110428056 A | 11/2019 | |
| CN | 110472745 A | 11/2019 | |
| CN | 110490305 A | 11/2019 | |
| CN | 110490330 A | 11/2019 | |
| EP | 3564873 A1 | 11/2019 | |
| WO | 2017/203093 A1 | 11/2017 | |
| WO | 2018/059939 A1 | 4/2018 | |
| WO | 2018/130267 A1 | 7/2018 | |
| WO | WO-2018130267 A1 * | 7/2018 | ............. G06F 17/18 |
| WO | 2018/191030 A1 | 10/2018 | |

OTHER PUBLICATIONS

Abadi et al., "TensorFlow: A System for Large-Scale Machine Learning", 2th USENIX Symposium on Operating Systems Design and Implementation (OSDI '16), Nov. 2-4, 2016, 21 pages.

Acar et al., "A Survey on Homomorphic Encryption Schemes: Theory and Implementation", ACM Computing Surveys, vol. 51, No. 4, Article 79, Jul. 2018, pp. 79:1-79:35.

Ali et al., "Applications of Blockchains in the Internet of Things: A Comprehensive Survey", IEEE Communications Surveys & Tutorials, 2018, 42 pages.

Bank for International Settlements, "Distributed ledger technology in payment, clearing and settlement", Committee on Payments and Market Infrastructures, Feb. 2017, 29 pages.

Ben Dickson, "The case for decentralized artificial intelligence", TechTalks, available online at <https://bdtechtalks.com/2018/01/10/decentralized-ai-blockchain/>, Jan. 10, 2018, 5 pages.

Bonawitz et al., "Practical Secure Aggregation for Privacy-Preserving Machine Learning", CCS'17, ACM, Oct. 30-Nov. 3, 2017, pp. 1175-1191.

Bonawitz et al., "Practical Secure Aggregation for Privacy-Preserving Machine Learning", Cryptology ePrint Archive: Report 2017/281, 2017, 21 pages.

Catherine Sturman, "OWKIN is set to use machine learning to augment medical and biology research", Healthcare Global, available online at <https://www.healthcareglobal.com/technology/owkin-set-use-machine-learning-augment-medical-and-biology-research>, Jun. 19, 2018, 8 pages.

Chen et al., "ALGORAND", Computer Science Cryptography and Security, May 26, 2017, pp. 1-75.

Chen et al., "When Machine Learning Meets Blockchain: A Decentralized, Privacy-preserving and Secure Design", IEEE International Conference on Big Data (Big Data), 2018, pp. 1178-1187.

Diro et al., "Deep Learning: The Frontier for Distributed Attack Detention in Fog-to-Things Computing", IEEE Communications Magazine, Feb. 2018,, pp. 169-175.

Extended European Search Report received for EP Patent Application No. 18177565.1, dated Nov. 30, 2018, 08 pages.

(56) References Cited

OTHER PUBLICATIONS

Extended European Search Report received for EP Patent Application No. 18177566.9, dated Dec. 13, 2018, 07 pages.
Extended European Search Report received for EP Patent Application No. 18183265.0, dated Feb. 4, 2019, 11 pages.
Fred Ehrsam, "Blockchain-based Machine Learning Marketplaces", Medium, available online at <https://medium.com/@FEhrsam/blockchain-based-machine-learning-marketplaces-cb2d4dae2c17>, Mar. 13, 2018, 10 pages.
Georgopoulos et al., "Distributed machine learning in networks by consensus", Neurocomputing, Elsevier, vol. 124, 2013, 11 pages.
Kate et al, "Distributed Key Generation in the Wild", Report 2012/377, 2012, pp. 1-30.
Kim et al., "On-Device Federated Learning via Blockchain and its Latency Analysis", Research Gate, Aug. 2018, 4 pages.
Kurakin et al., "Adversarial Examples in the Physical World", CoRR, abs/1607.02533, 2017, pp. 1-14.
Kurtulmus et al., "Trustless Machine Learning Contracts; Evaluating and Exchanging Machine Learning Models on the Ethereum Blockchain", Research Gate, Feb. 27, 2018, 11 pages.
Lei Shi, "The convergence of AI and IoT, are we there yet?", available online at <https://northstream.se/insights/blog/the-convergence-of-ai-and-iot-are-we-there-yet/>, Oct. 11, 2017, 11 pages.
Li et al., "Scaling Distributed Machine Learning with the Parameter Server", 11th USENIX Symposium on Operating Systems Design and Implementation, Oct. 6-8, 2014, 17 pages.
Mendis et al., "Blockchain as a Service: An Autonomous, Privacy Preserving, Decentralized Architecture for Deep Learning", Research Paper, Jul. 5, 2018, pp. 1-8.
Nakamoto et al., "Bitcoin: A Peer-to-Peer Electronic Cash System", Oct. 31, 2008, pp. 1-9.
Nedic et al., "Network Topology and Communication-Computation Tradeoffs in Decentralized Optimization", Jan. 15, 2018, 32 pages.
Pop at al., "Blockchain Based Decentralized Management of Demand Response Programs in Smart Energy Grids", MDPI, Jan. 9, 2018, pp. 1-21.
Sandha et al., "In-database Distributed Machine Learning: Demonstration Using Teradata SQL Engine," Proceedings of the VLDB Endowment, vol. 12, No. 12., Aug. 2019, pp. 1854-1857.
Search Report and Written Opinion received for PCT Application No. PCT/US2021/014932, dated May 13, 2021, 08 pages.
Search Report and Written Opinion received for PCT Application No. PCT/US2020/019064, dated Jun. 2, 2020, 15 pages.
Search Report and Written Opinion received for PCT Application No. PCT/US2021/013394, dated Apr. 19, 2021, 08 pages.
Shokri et al., "Membership Inference Attacks Against Machine Learning Models", CoRR, abs/1610.05820, 2017, 16 pages.
Singla et al . . . , "Machine Learning for Secure Device Personalization Using Blockchain", IEEE, Sep. 19, 2018, 7 pages.
Venkataraman et al., "Adopting blockchain for enterprise asset management (EAM)", IBM, available online at <https://developer.ibm.com/technologies/blockchain/tutorials/cl-adopting-blockchain-for-enterprise-asset-management-eam/>, Mar. 17, 2017, 15 pages.
Verbraeken et al., A Survey on Distributed Machine Learning, (Research Paper), ACM Computing Surveys, vol. 53, No. 2, Mar. 2020, pp. 1-33.
Weng et al., "DeepChain: Auditable and Privacy-Preserving Deep Learning with Blockchain-based Incentive", Journal of Latex Class Files, vol. 14(8), Nov. 2019, pp. 1-18.
Yuan et al., "Privacy Preserving Back-Propagation Neural Network Learning Made Practical with Cloud Computing", IEEE Transactions on Parallel and Distributed Systems, 2013, vol. 25, pp. 1-11.
Yuguang et al., "Review and Research for Consensus Mechanism of Block Chain", China Academic Journal Electronic Publishing House, Research Papers, vol. 4, No. 4, Apr. 2018, pp. 369-379. (English Abstract Only).
Zhang et al., "Stay Fresh: Speculative Synchronization for Fast Distributed Machine Learning", 2018 IEEE 38th International Conference on Distributed Computing Systems (ICDCS), 2018, 11 pages.
Cheung, et, al., "Distributed Machine learning white paper," 2017. (Year 2017).
M. Shen, X. Tang, L. Zhu, X. Du and M. Guizani, "Privacy-Preserving Support Vector Machine Training Over Blockchain-Based Encrypted IoT Data in Smart Cities," in IEEE Internet of Things Journal, vol. 6, No. 5, pp. 7702-7712, Oct. 2019, doi: 10.1109/JIOT.2019.2901840. (Year: 2019).
Reisizadeh et al., "Robust and Communication-Efficient Collaborative Learning", Oct. 31, 2019, 33 pages.
Resizadeh, et. al., "Quantized Decentralized Consensus Optimization"; 2018 IEEE Conference on Decision and Control (CDC) (Year: 2018).
Zhu, et. al., Blockchain-Based Privacy Preserving Deep Learning. In: Guo, F., Huang, X., Yung, M. (eds) Information Security and Cryptology. Inscrypt 2018. Lecture Notes in Computer Science( ), vol. 1144 (Year: 2018).
Watanabe et al, "Blockchain contract: A complete consensus using blockchain," 2015 IEEE 4th Global Conference on Consumer Electronics (GCCE), 2015, pp. 577-578, doi: 10.1109/GCCE.2015.7398721. (Year: 2015).
Yang et al. "Federated Machine Learning: Concept and Applications." arXiv preprint arXiv:1902.04885 (2019). (Year: 2019).
European Search Report and Search Opinion received for EP Application No. 21747157.2, dated Oct. 28, 2022, 5 pages.
Li et al., "DLBC: A Deep Learning-Based Consensus in Blockchains for Deep Learning Services", IEEE Transactions on Services Computing, Jan. 31, 2020, 13 pages.
Lihu et al., "A Proof of Useful Work for Artificial Intelligence on the Blockchain", Jan. 25, 2020, 25 pages.
Teerapittayanon et al., "DaiMON: A Decentralized Artificial Intelligence Model Network", Jul. 2019, 8 pages.
Xu, R., et al., "HybridAlpha: An Efficient Approach for Privacy-Preserving Federated Learning", ACM, Nov. 11, 2019, pp. 11.
Xu et al., "HybridAlpha: An Efficient Approach for Privacy-Preserving Federated Learning", ACM, 2019,11 pages.
Castro et al, "Practical Byzantine Fault Tolerance", Proceedings of the Third Symposium on Operating Systems Design and Implementation, New Orleans, USA, Feb. 1999 (Year: 1999).
Chen et al, "On Security Analysis of Proof-of-Elapsed-Time (PoET)", In: Spirakis, P., Tsigas, P. (eds) Stabilization, Safety, and Security of Distributed Systems. SSS 2017. Lecture Notes in Computer Science( ), vol. 10616. Springer, Cham, https://doi.org/10.1007/978-3-319-69084-1_19 (Year: 2017).
Feng et al, "Scalable Dynamic Multi-Agent Practical Byzantine Fault-Tolerant Consensus in Permissioned Blockchain". Appl. Sci. 2018, 8, 1919. https://doi.org/10.3390/app8101919 (Year: 2018).
Nguyen et al, "A Survey about Consensus Algorithms Used in Blockchain", J Inf Process Syst, vol. 14, No. 1, pp. 101-128, Feb. 2018 https://doi.org/10.3745/JIPS.01.0024 (Year: 2018).

* cited by examiner

SECURE PARAMETER MERGING USING HOMOMORPHIC ENCRYPTION FOR SWARM LEARNING

CROSS-REFERENCE TO RELATED APPLICATION

This application is a Continuation of U.S. application Ser. No. 16/773,555, filed on Jan. 27, 2020, the content of which are incorporated herein by reference in its entirety. The Applicant hereby rescinds any disclaimer of claim scope in the parent application or the prosecution history thereof and advices the USPTO that the claims in this application may be broader than any claim in the parent application.

DESCRIPTION OF THE RELATED ART

Geo-distributed, decentralized enterprise infrastructures or systems such as factory floors, clusters of geographically distributed servers, fleets of autonomous vehicles, Internet of Things (IoT) networks, and the like can be difficult to manage. Aside from being decentralized, these systems can be massive in scale, and heterogeneous in nature. It can be appreciated that managing such systems may present logistic challenges that are compounded when these infrastructures have or interact with devices (also referred to as "nodes") that operate outside of an enterprise network, e.g., are owned by another one or more users or entities.

Machine learning (ML) can refer to a method of data analysis in which the building of an analytical model is automated. ML is commonly considered to be a branch of artificial intelligence (AI), where systems are configured and allowed to learn from gathered data. Such systems can identify patterns and/or make decisions with little to no human intervention.

Blockchain can refer to a tamper-proof, decentralized ledger that establishes a level of trust for the exchange of value without the use of intermediaries. A blockchain can be used to record and provide proof of any transaction on the blockchain, and is updated every time a transaction occurs.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof.

Figure 1A:
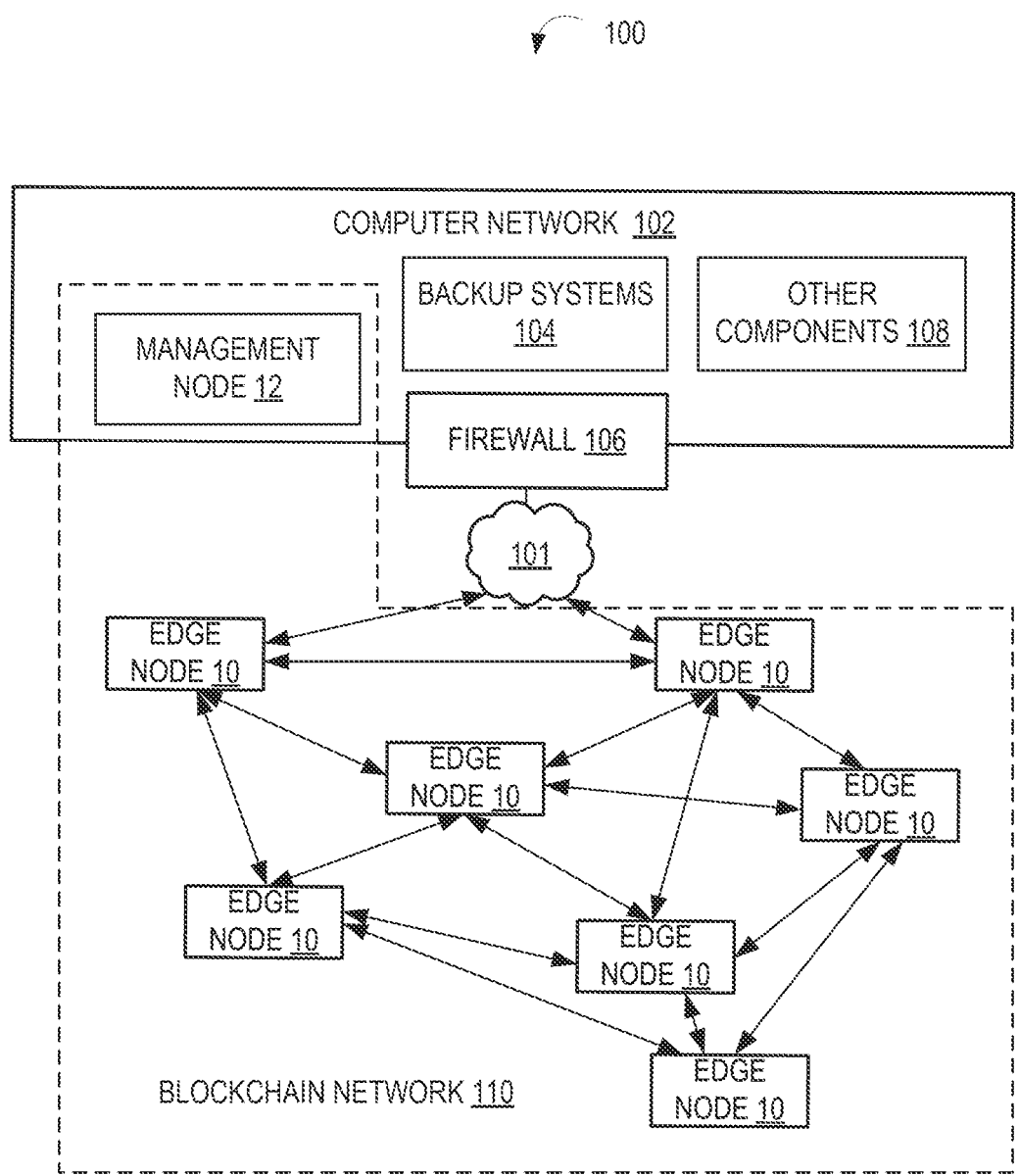
FIG. 1A illustrates an example of a system of decentralized management of device assets outside a computer network in accordance with an embodiment of the disclosed technology.

The figures are not intended to be exhaustive or to limit embodiments to the precise form disclosed. It should be understood that the invention can be practiced with modification and alteration, and that the disclosed technology be limited only by the claims and the equivalents thereof.

DETAILED DESCRIPTION

Distributed ML can refer to ML model building across multiple nodes using data locally available to each of the nodes. The local model parameters learned from each local model can be merged to derive a global model, where the resulting global model can be redistributed to all the nodes for another iteration, i.e., localized data trains the global model. This can be repeated until the desired level of accuracy with the global model is achieved. In situations where the nodes can be trusted, the security of parameters exchanged throughout the network of local nodes is of minimal concern. However, in the context of swarm learning, where nodes may be geographically distributed and/or may be controlled by different entities, security becomes an important consideration, as the nodes may not be trusted. Moreover, data privacy rules/regulations demand protection against unauthorized disclosure of private data.

Although homomorphic encryption techniques exist/are being developed that allow computations to be performed on ciphertext (rather than first decoding the ciphertext into plaintext), such techniques nevertheless require some form of shared secret, which can leave a system open to attack. For example, in conventional systems that utilize homomorphic encryption, a centralized server in the cloud will generally aggregate partial parameters and global parameters. User data is encrypted and uploaded to the cloud so that the centralized server can compute model updates. The shared secret can be generated and used such that participants "split" the shared secret into n shares, such that any t shares can be used to reconstruct the shared secret. Accordingly, entities may become privy to keys that can decode ciphertext. Moreover, these conventional systems are asynchronous and prone to failure. That is, in conventional distributed ML systems, a central controller node may send some subset of nodes of a plurality of nodes an ML mode to train using data local to each of the subset of nodes. Each of the subset of nodes returns a trained version of the ML model back to the central controller node. Thus, the central controller node may only merge parameters extracted from these trained versions of the ML model when a node from the subset of nodes responds with its version of the ML node. In swarm learning, as described herein, a quorum of nodes may be required to respond before parameter merging commences (synchronous operation), producing more stable merged parameters, and allows nodes that may run or operate at different speeds the opportunity to contribute to the training of an ML mode. Moreover, reliance on a central controller node creates a single point of failure in terms of security for an entire distributed learning network. As will also be described in greater detail below, eschewing the use of a central controller node in favor of a swarm learning platform implemented across a plurality of nodes in a blockchain network prevent a single node from monopolizing that network.

Thus, in order to protect data in such an environment, various embodiments are directed to systems and methods of key generation and management that prevent any one participant in a swarm learning network from gaining access to plaintext parameter data and to all of the shared secrets at any time during the parameter-merging process.

In particular, upon determining that a quorum of nodes in a swarm learning network are ready to merge their respective model parameters, (1) a merge leader is elected. It should be understood that in swarm learning, each node possessing local training data trains a common ML model without sharing the local training data to any other node or entity in the swarm blockchain network. This is accomplished by sharing parameters (weights) derived from training the common ML model using the local training data. In this way, the learned insights regarding raw data (instead of the raw data itself) can be shared amongst participants or collaborating peers/nodes, which aids in protecting data against privacy breaches. Moreover, swarm learning as described herein leverages blockchain technology to allow for decentralized control, monetization, and ensuring trust and security amongst individual nodes.

The merge leader may (2) request a separate key manager to generate a public key that can be used to encrypt the local model parameters of the nodes. Upon obtaining the public key, the merge leader (3) publishes it to a distributed ledger of the swarm blockchain network that includes the nodes. Each node may read (but may not write to the distributed ledger), and thus may (4) obtain the public key and proceed with encrypting the local model parameters. It should be noted that the public key may be a compute-intensive encryption process that is relegated to the edge (the nodes), avoiding any scaling bottlenecks.

The nodes may (5) signal/inform the merge leader that they are respectively ready to merge their local model parameters. The merge leader (6) downloads the local model parameters and performs a merge operation (homomorphic summation and scalar multiplication). Because merging of the local model parameters is performed by an elected merge leader rather than a static, centralized server, a distributed/decentralized implementation can be achieved. This in turn, can provide greater fault-tolerance than conventional implementations. Nodes have the collective intelligence of the overall network without the raw data ever needing to leave its corresponding node. The merge leader may (7) inform the nodes that the merged parameters/updated global model is ready for decryption. All the nodes, other than that elected to be the merge leader (8) elect a decryptor to decrypt the merged parameters making up the updated global model.

While the remaining nodes wait, the decryptor (9) requests a private key from the key manager, downloads the merged parameters from the merge leader, decrypts the merged parameters, uploads the merged parameters to the merge leader, and instructs the key manager to discard the public-private key pair. The decryptor (10) signals that the merged parameters are available from the merge leader. The nodes (11) download the now, decrypted merged parameters, and apply them to their local model for an ML model building iteration. More localized parameters may be computed/generated, and additional ML model building iterations (training) can occur.

Embodiments of the technology disclosed herein build on distributed ML and blockchain. Distributed ML, as alluded to above, can be leveraged for its ability to train a common model across multiple nodes (global model) using data (or a subset(s) of data) at each node of the network. The blockchain aspect allows for decentralized control and scalability, while also providing the requisite fault-tolerance to enable embodiments to work beyond the single enterprise/entity context. Moreover, the blockchain aspect introduces a tamper-proof/resistant cryptocurrency, with which participating nodes or data sources can use to monetize their data contribution(s) to training the global model.

The blockchain framework will be described first. A controller framework can be provided that allows participant nodes in a network to interact with each other using blockchain technology. The use of blockchain technology for these interactions may be implemented to ensure that the interactions are secured, non-repudiated, sequenced and permissioned. Embodiments may also be implemented to use a blockchain to allow participants to evolve a consensus protocol for one or more aspects of the distributed ML portion of the swarm learning framework. For example, consensus protocols can be agreed by all participants (nodes) and implemented as smart contracts in the system using blockchain technology.

In another embodiment, operations may be implemented to provide provenance tracking across a heterogeneous distributed storage platform to track which nodes conducted which operations on which systems. In some applications, metadata operations may be routed via a blockchain and storage devices or other network entities can be configured to accept operations only via the blockchain interface. For example, storage devices on the network can be commanded to allow metadata operations only via the blockchain interface. In this way, factors such as identity, authorization, provenance, non-repudiation and security can be provided for operations on nodes managed in this way.

Accordingly, embodiments may be implemented in which the management operation becomes decentralized and the system no longer requires a central entity to enforce policies. Particularly, in some applications, the system may be implemented with no central management server, and may instead use only a management node or nodes to input management instructions onto the blockchain using blockchain transactions (such as the aforementioned merge leader, decryptor, etc. Once a change is approved, a device may implement the change and the blockchain can be used to provide a clear record of state of the system as it evolves over time. Because embodiments may be implemented in a peer-to-peer environment without a central management entity, the enterprise is scalable without limitations on how many nodes a central management entity might be able to address. Additionally, the absence of a central management entity may also eliminate this entity as a single point of failure. This may provide the added benefit of reducing attack surfaces by eliminating a single point of failure that might otherwise be used to bring the system down.

Decentralized management of assets operating outside a computer network (also referred to as edge nodes) from within the computer network may be achieved. The edge nodes may include enterprise devices and the computer network may include the enterprise's network. Network traffic to and from the computer network may pass through a firewall around the computer network. A management server (also referred to as a management node) may operate within the firewall to manage the configuration of edge nodes operating outside the firewall using blockchain technology. The management node and the edge nodes may be part of a blockchain network.

The management node may act as a full node that stores a complete or at least updated copy of a distributed ledger. The management node may also act as a miner that has permission to write blocks to the distributed ledger. The management node may mine management operations in the form of change requests into the distributed ledger. The management operations may include, without limitation, removal of an edge node from the network (such as resulting from non-compliance of the edge node to set protocols followed by the network). Management operations may also include the addition of a new asset (edge node) in to the network and configuring of that new asset, as well as proposal of a new software update that will be installed on all edge nodes. Further still, management operations can include the execution of a status check on some or all of the edge nodes, and/or other operations that can be remotely ordered and applied locally at an edge node.

Updates to the distributed ledger are propagated to all of the nodes (such as the edge nodes and the management node) according to a blockchain specification, including via peer-to-peer sharing. This permits the management node to communicate change requests to edge nodes through the distributed ledger in a secure and immutable way. This also permits generation of a historic and current record of the management operations. As such, a historic and current state of the system may be stored and retrieved from the distributed ledger.

Each of the edge nodes may act as a full node that stores a complete or at least updated copy of the distributed ledger. In some instances, none of the edge nodes have permission to write to the distributed ledger and therefore cannot issue change requests to other edge nodes. An edge node may read its local copy of the distributed ledger to obtain the change requests. Upon receipt of a change request, the edge node may implement the change request and update its state to indicate the change request has been implemented. This state transition may be broadcast to other nodes, such as in the form of a blockchain transaction. The management node may collect transactions not yet written to the distributed ledger and write them to the distributed ledger, thereby ensuring an immutable and distributed record of change requests and state transitions. As such, the distributed ledger may record the current and historic configuration of the edge nodes.

Use of the foregoing architecture ensures management operations are secured, non-repudiated, sequenced, and permissioned. Management operations become partially "decentralized"; as a data center within a computer network serves as a management node that enforces policies and electronically proposes changes. Once a change is mined into the distributed ledger, each of the systems implement the change and there is a clear record and undisputable record of state of the system as it progressed and evolved over time. For example, an edge node can synchronize its copy of the distributed ledger from other edge nodes (or from the management node) to obtain the current, valid, and immutable configuration of the system. The foregoing permits system scaling, as any participant of the system may access current (and historic) state information from the distributed ledger. New edge nodes may be added by providing the new node with a copy of the distributed ledger. A new edge node may then configure itself according to the current state information from its copy of the distributed ledger or otherwise obtain software or other updates consistent with the current state information.

FIG. 1A illustrates an example of a system 100 of decentralized management of device assets outside a computer network 102, according to an implementation of the invention. System 100 may include a blockchain network 110. The blockchain network 110 may include a plurality of nodes that are connected to one another using one or more connection protocols, including a peer-to-peer connection protocol. The nodes of the blockchain network 110 may include a management node 12 and edge nodes 10. The particular number of, configuration of, and connections between the edge nodes 10 may vary. As such, the arrangement of the edge nodes 10 shown in FIG. 1A is for illustrative purposes only.

The management node 12 is part of and operates within a firewall 106 of computer network 102 and the edge nodes 10 operate outside the firewall. As alluded to above, and as will be described in greater detail below, such edge nodes 10 may contribute data that can be used to train a local instance of a global ML model in a swarm learning context. The computer network 102 may also include one or more backup systems 104 that provides failover protection for the management node 12 and/or other components 108 operating within the computer network. The components of the computer network 102 may communicate with one another via a local area network ("LAN"). The components of the computer network 102 may communicate with devices outside the computer network 102 through the firewall 106. The firewall 106 may be configured as a software firewall and/or a hardware firewall device. The firewall 106 may include or connect with a network switch device that routes network traffic into and out of the computer network via the firewall. The network 101 may include a wide area network ("WAN") that connects devices outside the firewall 106.

Examples of further details of a management node 12 will now be described with reference to FIG. 1B. The management node 12 may include one or more processors 20 (also interchangeably referred to herein as processors 20, processor(s) 20, or processor 20 for convenience), one or more storage devices 40, and/or other components. The processor 20 may be programmed by one or more computer program instructions. For example, the processor 20 may be programmed to execute a management user interface 22 (illustrated as "management user interface 22"), a controller 24, a blockchain interface layer 30, and/or other instructions to perform various operations, each of which are described in greater detail herein. As used herein, for convenience, the various instructions will be described as performing an operation, when, in fact, the various instructions program the processors 20 (and therefore management node 12) to perform the operation.

The management user interface 22 may provide an interface, such as a graphical user interface, a command line interface, and/or other type of interface configured to receive management option inputs. For instance, a user such as a system administrator may use the management user interface 22 to input management operations to be conducted on one or more of the edge nodes 10 of the blockchain network 110, or to input an edge node to be added. In this manner, the user may manage edge nodes 10 based on change requests originating from within the computer network 102.

The controller 24 may obtain management operations to be performed and may communicate them to the relevant edge nodes 10. The management operations may be obtained from the management user interface 22 and/or a global policy 48. Controller 24 may communicate the management operations using the blockchain interface layer 30. For example, the controller 24 may write the management operations into a blockchain transaction that is broadcast to the edge nodes 10. The blockchain transaction may be broadcast using a multicast protocol to several or all edge nodes 10. In some instances, the blockchain transaction may be broadcast using peer-to-peer networking in which the management node 12 acts as a peer to broadcast the transaction to at least one other peer (in this case, an edge node 10), which broadcasts the transaction to other peers and so on. In some implementations, the controller 24 may wait until a blockchain transaction is signed by an edge node 10 as described herein before writing the transaction to a block (also referred to herein as a "ledger block") of the distributed ledger 42. In these implementations, the edge nodes 10 may obtain management operations directly from the broadcasted transaction. In other implementations, the controller 24 may write the transaction to a block of the distributed ledger 42. In these implementations, the edge nodes 10 may obtain management operations by obtaining the current (in other words latest) block that references transactions having management operations.

In whichever manner the controller 24 broadcasts the management operations to edge nodes 10 using the blockchain interface layer 30, the controller may do so in a manner that is directed all edge nodes 10. For example, a management operation of "check status" may be directed to all nodes of the blockchain network 110 so that each edge node is instructed to perform a status check. Each edge node 10 will then perform the status check and broadcast its state indicating the results of the status check (or other management operation as described below).

In some instances, the controller 24 may target one or more edge nodes 10 to receive a management operation. In these implementations, the controller 24 may generate a blockchain transaction and/or a block on the distributed ledger 42 directed to the targeted edge node(s) 10. For instance, the controller 24 may encode an identifier of the edge node 10 that is targeted. Alternatively or additionally, the controller 24 may encode a device type that targets certain types of edge nodes 10 that should perform management operations. Still other examples include locations that should be targeted such that edge nodes in certain geolocations are targeted. The smart contracts 44 may include rules, which each edge node 10 follows, that direct the nodes to inspect transactions and/or blocks to determine whether it should apply a management operation contained in the transaction and/or block. In some implementations, the controller 24 may encrypt the management operation to be performed with a target edge node's 10 public key such that only the target edge node can decrypt the management operation with its private key.

In some instances, certain management operations may be executed periodically without user intervention. For example, controller 24 may execute a daemon or other process that periodically causes a status check from all edges nodes 10 to be executed. This daemon may periodically generate relevant change requests, which are issued to the edge nodes 10—and tracked via—the distributed ledger 42.

In an implementation, the controller 24 may enforce global policy 48 by ensuring that the state of the network complies with the global policy. For instance, the controller 24 may periodically obtain the current system state from the distributed ledger 42. As noted elsewhere, state transitions of the edge nodes 10 may be recorded on the distributed ledger 42. Alternatively or additionally, the result of status checks may be written to the distributed ledger 42, indicating the current state of the system. The controller 24 may compare the current system state (such as state of the blockchain network 110) with the global policy 48, which may specify a desired state of the system. The desired state may include a macro state of the system as a whole and/or a micro-state of any individual or group of edge nodes. Any discrepancies may be noted and an edge node 10 in non-compliance may be targeted for executing a management operation that will resolve the non-compliance. In some instances, the smart contracts 44 and/or global policy 48 may encode rules that specify when a non-complying edge node 10 should be taken offline. For instance, the rules may specify an edge node 10 that continues to be in non-compliance after N number of blocks have been written to the distributed ledger 42 should be taken offline. Other parameters may specify such removal as well. The foregoing may ensure recurring policy enforcement and compliance using the blockchain interface layer 30.

In one embodiment, in connection with certain types of management operations, the controller 24 may make available files for download. For instance, operating system images, software updates, new software, and/or other downloadable files or data may be made available for edge nodes 10 to download in connection with a management operation. As will be described below, in some embodiments, downloadable files may include files containing particular encryption keys, merged parameters, etc. This may ensure that the distributed ledger 42 itself does not have to store such files or data but stores an immutable record of current files or data that should be used (as well as historic listing of such files or data).

The blockchain interface layer 30 may be used to interface with the distributed ledger 42 in accordance with the smart contracts 44. The blockchain interface layer 30 is described with reference to FIG. 1D below.

The storage devices 40 may store a distributed ledger 42, smart contracts 44, node keys 46, and/or other data. The distributed ledger 42 may include a series of blocks of data that reference at least another block, such as a previous block. In this manner, the blocks of data may be chained together. An example of a distributed ledger is described in the well-known white paper "Bitcoin: A Peer-to-Peer Electronic Cash System," by Satoshi Nakamoto (bitcoin.org), the contents of which are incorporated by reference in its entirety herein. The distributed ledger 42 may store blocks that indicate a state of an edge node 10 relating to its configuration or other management information.

The smart contracts 44 may include rules that configure nodes to behave in certain ways in relation to decentralized management of edge nodes. For example, the rules may specify deterministic state transitions, which nodes may enroll to participate in decentralized management, rules for implementing a change request issued by the management node 12, and/or other actions that an edge node 10 or management node 12 may take for decentralized management. In some embodiments, such rules may specify when to elect a merge leader, what edge node 10 to exclude from decryptor election, etc.

The node keys 46 may store public encryption keys of edge nodes 10 in association with their identities (such as Internet Protocol or other addresses and/or identifying information). In this manner, in some implementations, change requests may be targeted to specific edge nodes 10 and encrypted using the target edge node's public key.

The global policy 48 may store a security or other policy for the system. The global policy 48 may include, for example, network configuration settings, security configuration settings, operating system settings, application settings, policy rules, and/or other policy information for devices managed by the management node 12.

Examples of further details of an edge node 10 will now be described with reference to FIG. 1C. An edge node 10 may be a fixed or mobile device. While only one of the edge nodes 10 is illustrated in detail in the figures, each of the edge nodes 10 may be configured in the manner illustrated. The edges nodes 10 may communicate with one another in a peer-to-peer manner. The edge nodes 10 may each include one or more processors 50 (also interchangeably referred to herein as processors 50, processor(s) 50, or processor 50 for convenience), one or more storage devices 70, and/or other components.

The processor 50 may be programmed by one or more computer program instructions. For example, the processor 50 may be programmed to execute a blockchain agent 52, a configuration manager 54, a blockchain interface layer 30, and/or other instructions to perform various operations, each of which are described in greater detail herein. As used herein, for convenience, the various instructions will be described as performing an operation, when, in fact, the various instructions program the processors 50 (and therefore edge node 10) to perform the operation.

The blockchain agent 52 may use the blockchain interface layer 30 to communicate with other edge nodes 10 and/or management node 12. The blockchain interface layer 30, described with reference to FIG. 4, may operate in the same manner at management node 12 and edge node 10 to communicate with the blockchain network (other than being able to write to the distributed ledger 42). For example, the blockchain agent 52 may obtain an updated copy of the distributed ledger 42 from one or more other edge nodes 10 and/or management node 12. The blockchain agent 52 may also obtain management operations from the distributed ledger 42 written by the management node 12. In this manner, the management node 12 may communicate management operations to be performed at an edge node 10 through the distributed ledger 42.

The configuration manager 54 may obtain one or more management operations from the blockchain agent 52. The configuration manager 54 may apply the one or more management operations to the edge node 10. In some instances, the configuration manager 54 may apply the management operations without a determination of whether to do so. In other instances, the configuration manager 54 may consult one or more local policies to ensure that the edge node 10 can comply with the one or more management operations. The local policies may be encoded by the smart contracts 44. Alternatively or additionally, some local policies may be stored in a local policy 78, which is not necessarily shared with other edge nodes 10. In other words local policy 78 may be defined specifically at an edge node at which it is stored.

Once the configuration manager 54 has acted on the one or more management operations (whether by applying them or not), the blockchain agent 52 may broadcast its state to other nodes of the blockchain network 110. For example, the blockchain agent 52 may generate and transmit a blockchain transaction that indicates the state of the edge node 10 (such as whether, how, and/or when the one or more management operations have been applied). The blockchain transaction may include information identifying the management operation was (or was not) performed. For example, the information identifying the management operation may be a block identifier (such as a block hash) that identifies the block from which the management operations was obtained. In this manner, the blockchain transaction indicating a node's state may record the management operation that was (or was not) applied.

For implementations in which management operations are targeted to an edge node 10 and encrypted using the targeted edge node 10's public key 72, the blockchain agent 52 may decrypt the management operations using the edge node 10's private key 74. In some implementations, the blockchain agent 52 may digitally sign a blockchain transaction from the management node 12 that includes the management operation. For instance, the management node 12 may generate a transaction directed to the edge node 10 and sign the transaction using the management node 12's public key.

The management node 12 may then write the signed transaction to the distributed ledger 42 to create an immutable record of the management operation and state change of the targeted edge node. In this manner, the transaction may be securely proven to have been executed by the edge node 10. It should be noted that the edge node 10 need not specifically be targeted in order to sign the transaction so as to create a record of the edge node's 10 state in a transaction and therefore block.

Upon receipt of a transaction, the edge node 10 apply the management operation and indicate that it has successfully done so by signing the transaction with the edge node's private key. The management node 12 may write this transaction into the distributed ledger 42, creating a secure, immutable record that proves that the edge node received and applied the management operation. In some implementations, an edge node 10 may be associated with a series of transactions such that each transaction may refer to a previous transaction hash. The transactions may be written to the distributed ledger 42 by the management node 12, creating an immutable and historic record of transactions for a given edge node 10.

In an implementation, the configuration manager 54 may periodically ensure compliance with the current state of the system. For instance, the smart contracts 44 may encode rules that specify what events trigger such checking. The events may include a restart, a new initialization, a passage of a period of time, a number of blocks written to the distributed ledger 42, a security event such as detection of malware, an input from a user specifying that the check should occur, and/or other event that can trigger compliance evaluation. To evaluate compliance, the configuration manager 54 may determine whether any current management operations (as defined by the latest block encoding such operations), including global ones and those specifically targeted to the edge node 10. If so, the configuration manager 54 may determine whether they should have been but were not implemented. If not, the configuration manager 54 may implement the management operations. In this manner, the edge nodes 10 may self-enforce the current management operations (as defined by the current system state).

The storage devices 70 may store an edge node's copy of the distributed ledger 42, the edge node's copy of smart contracts 44, the edge node's public key 72, the edge node's private key 74, and/or other data.

Figure 1C:
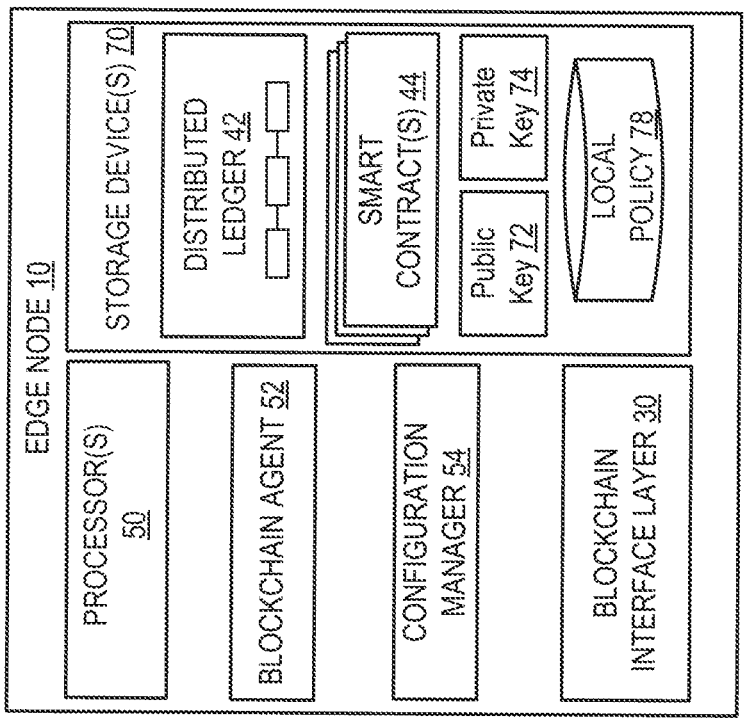
FIG. 1C illustrates an example of an edge node in a distributed blockchain network for decentralized management of device assets outside a computer network in accordance with an embodiment of the disclosed technology.
Figure 1B:
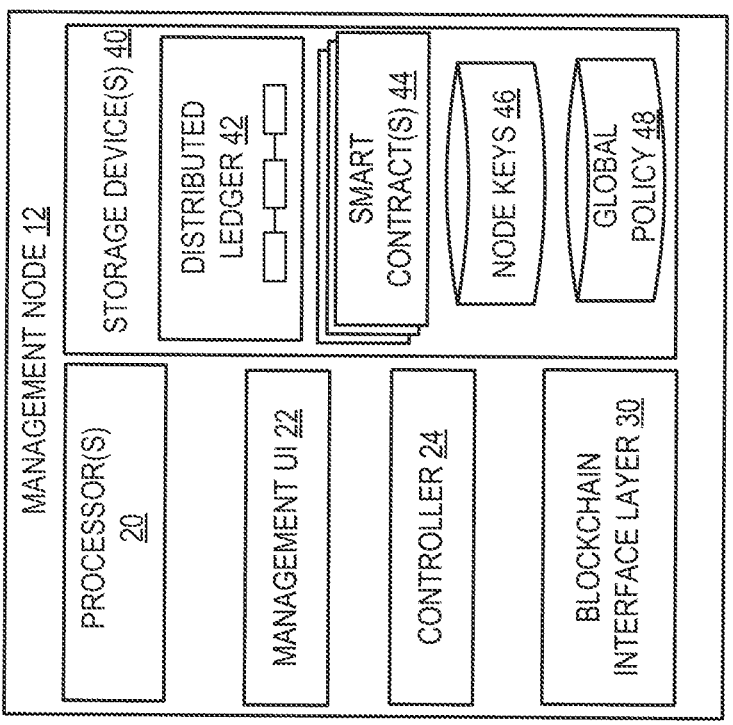
FIG. 1B illustrates an example of a management node in a distributed blockchain network for decentralized management of device assets outside a computer network in accordance with an embodiment of the disclosed technology.
Figure 1D:
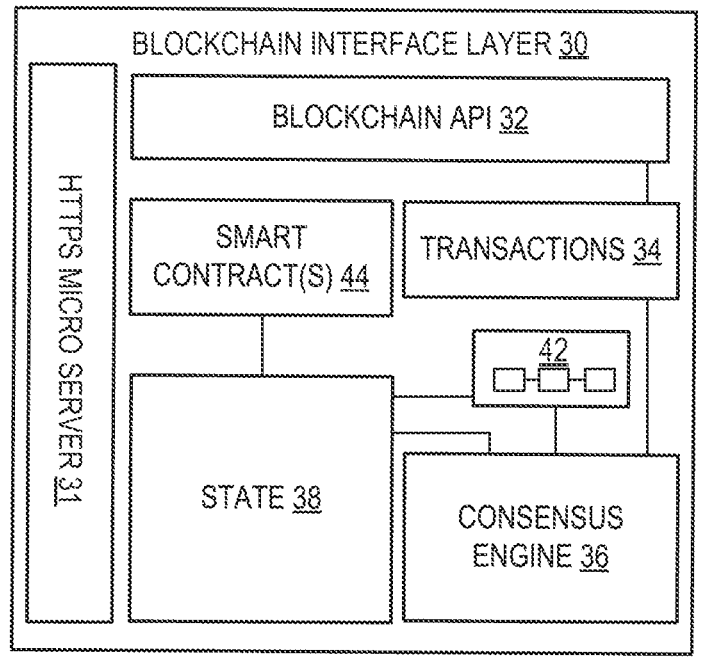
FIG. 1D illustrates an example of a blockchain interface layer for decentralized management of device assets outside a computer network in accordance with an embodiment of the disclosed technology.

Reference will now be made to FIG. 1D, which illustrates an example of the blockchain interface layer 30. Each of the edge nodes 10 and the management node 12 may implement the blockchain interface layer 30, except that the edge nodes 10 may not have permission to write to the distributed ledger 42. The blockchain interface layer 30 may include a messaging interface used to communicate with the blockchain network 110. The messaging interface may be configured as a Secure Hypertext Transmission Protocol ("HTTPS") microserver 31. Other types of messaging interfaces may be used as well. The blockchain interface layer 30 may use a blockchain API 32 to make calls for blockchain functions based on a blockchain specification. Examples of blockchain functions include, but are not limited to, reading and writing blockchain transactions 34 and reading and writing blockchain blocks to the distributed ledger 42. One example of a blockchain specification is the Ethereum specification. Other blockchain specifications may be used as well. Consensus engine 36 may include functions that make consensus decisions, such as whether to enroll a node to participate in decentralized management of the edge nodes. The state of a node 10 can be reflected by state 38.

Although illustrated in FIGS. 1B and 1C as a single component, a management node 12 or edge node 10, respectively, may include a plurality of individual components (such as computer devices) each programmed with at least some of the functions described herein. The one or more processors 20 or 50 may each include one or more physical processors that are programmed by computer program instructions. The various instructions described herein are provided for illustrative purposes. Other configurations and numbers of instructions may be used, so long as the processor(s) 20 or 50 are programmed to perform the functions described herein.

Furthermore, it should be appreciated that although the various functions are illustrated in FIGS. 1B and 1C as being co-located within a single processing unit, in implementations in which processor(s) 20 or 50 includes multiple processing units, one or more instructions may be executed remotely from the other instructions.

The various instructions for performing various functions described herein may be stored in a storage device 40 or 70, which may comprise random access memory (RAM), read only memory (ROM), and/or other memory. Storage device 40 or 70 may store the computer program instructions (such as the aforementioned instructions) to be executed by processor 20 or 50, respectively, as well as data that may be manipulated by processor 20 or 50. Storage device 40 or 70 may comprise one or more non-transitory machine-readable storage media such as floppy disks, hard disks, optical disks, tapes, or other physical storage media for storing computer-executable instructions and/or data.

The distributed ledger 42, transaction queue, smart contracts 44, management operations to be performed, and/or other information described herein may be stored in various storage devices such as storage device 40 or 70. Other storage may be used as well, depending on the particular storage and retrieval requirements. For example, the various information described herein may be stored using one or more databases. The databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The edge nodes 10 and management node 12 illustrated in FIGS. 1C and 1B, respectively, may be coupled to other nodes via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1A, as well as in other figures, different numbers of entities than those depicted may be used. Furthermore, according to various implementations, the components described herein may be implemented in hardware and/or software that configure hardware.

Swarm learning can involve various stages or phases of operation including, but not limited to: initialization and onboarding; installation and configuration; and integration and training. Initialization and onboarding can refer to a process (that can be an offline process) that involves multiple entities interested in Swarm-based ML to come together and formulate the operational and legal requirements of the decentralized system. This includes aspects such as data (parameter) sharing agreements, arrangements to ensure node visibility across organizational boundaries of the entities, and a consensus on the expected outcomes from the model training process. Values of configurable parameters provided by a swarm learning network, such as the peer-discovery nodes supplied during boot up and the synchronization frequency among nodes, are also finalized at this stage. Finally, the common (global) model to be trained and the reward system (if applicable) can be agreed upon.

Once the initialization and onboarding phase is complete, all participants (edge nodes 10, for example) may download and install a swarm learning platform/application onto their respective machines, i.e., nodes. The swarm learning platform may then boot up, and each node's connection to the swarm learning/swarm-based blockchain network can be initiated. As used herein, the term swarm learning platform can refer to a blockchain overlay on an underlying network of connections between nodes. The boot up process can be an ordered process in which the set of nodes designated as peer-discovery nodes (during the initialization phase) are booted up first, followed by the rest of the nodes in the swarm learning network.

With regard to the integration and training phase, the swarm learning platform can provide a set of APIs that enable fast integration with multiple frameworks. These APIs can be incorporated into an existing code base for the swarm learning platform to quickly transform a stand-alone ML node into a swarm learning participant. It should be understood that participant and node may be used interchangeably in describing various embodiments.

Figure 2A:
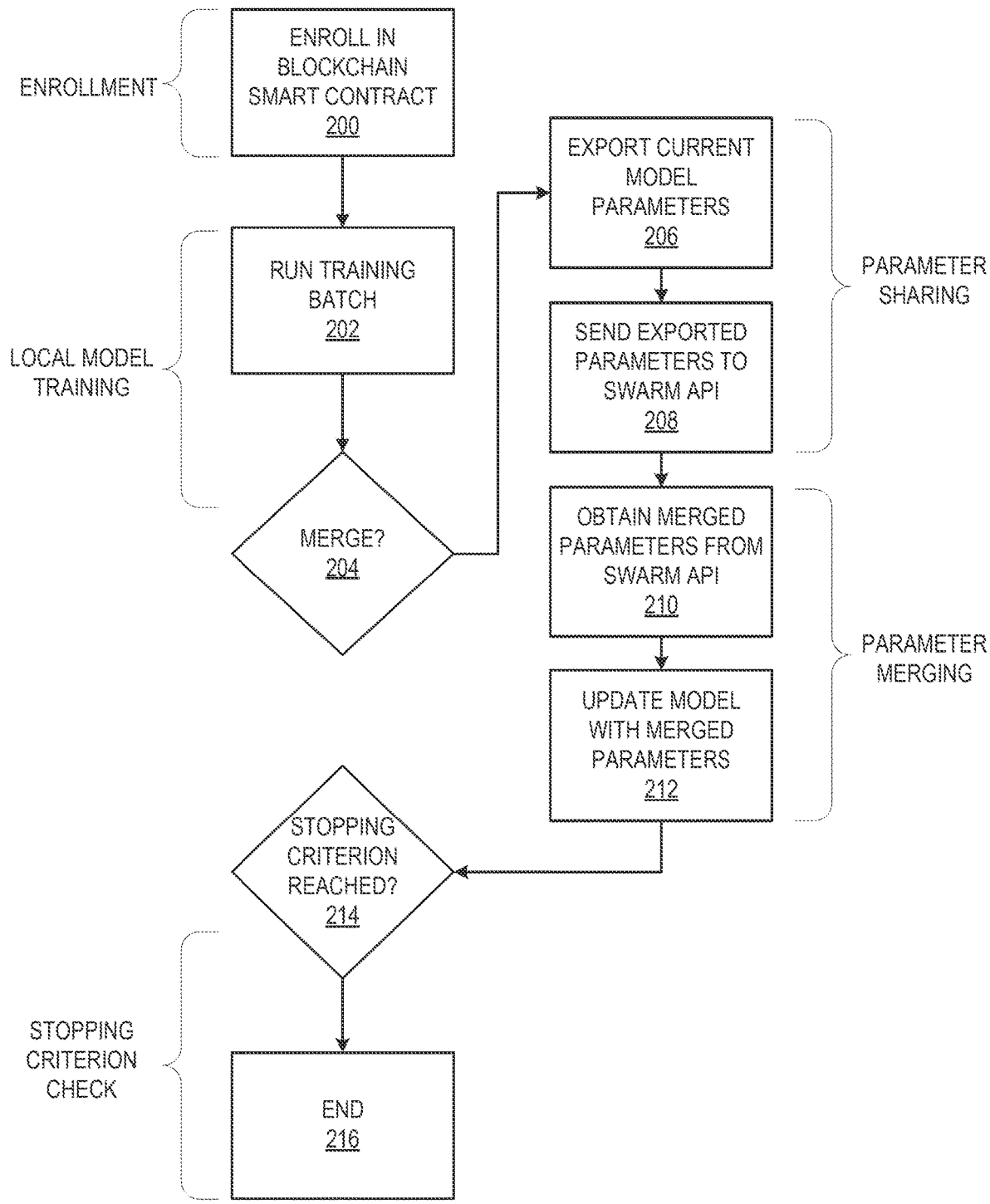
FIG. 2A illustrates an example swarm learning architecture in accordance with an embodiment of the disclosed technology.

At a high level, model training in accordance with various embodiments may be described in terms of enrollment, local model training, parameter sharing, parameter merging, and stopping criterion check. FIG. 2A illustrates operations that can be performed by the swarm learning platform in accordance with one embodiment. At 200, enrollment occurs. That is, each node in the swarm learning network may enroll or register itself in a swarm learning contract. In one embodiment, this can be a one-time process. In other embodiments, enrollment or registration may be performed after some time as a type of verification process. Each node can subsequently record its relevant attributes in the swarm learning contract, e.g., the uniform resource locator (URL) from which its own set of trained parameters can be downloaded by other nodes.

At 202, local model training occurs, where each node proceeds to train a local copy of the global or common model in an iterative fashion over multiple rounds that can be referred to as epochs. During each epoch, each node trains its local model using one or more data batches for some given number of iterations. A check to determine if parameters can be merged may be performed at 204. The check can determine if the threshold number of iterations has been reached and/or whether a threshold number of nodes are ready to share their respective parameters. These thresholds can be specified during the initialization phase. After the threshold number of iterations has been reached, the parameter values of each node are exported to a file, which can then be uploaded to a shared file system for other nodes to access. Each node may signal the other nodes that it is ready to share its parameters.

Once parameter sharing commences, current model parameters may be exported at 206 and the exported parameters can be sent to a swarm learning application programming interface (API) (described in greater detail below) at 208. The parameter sharing phase can begin with the election of a merge or epoch leader, whose role is to merge the parameters derived after local training on the common model at each of the nodes. This election of a merge or epoch leader can occur after each epoch. While it is possible to elect a node to act as the merge leader across multiple epochs, electing a merge leader after each epoch helps ensure privacy by changing which node has the public key. Upon selection of one of the nodes of the swarm learning network to be the merge leader, the URL information of each participant or node can be used to download the parameter files from each node. In one embodiment, a star topology can be used, where a single merge leader performs the merge. Other topologies, such as a k-way merge, where the merge is carried out by a set of nodes may also be used.

The merge leader may then merge the downloaded parameter files (from each swarm learning network node). Appropriate merge mechanisms or algorithms may be used, e.g., one or more of mean merging, weighted mean merging, median merging, etc. The merge leader may combine the parameter values from all of the nodes to create a new file with the merged parameters, and signals to the other nodes that a new file is available. At 210, each node may obtain the merged parameters (represented in the new file) from the merge leader via the swarm API. At 212, each node may update its local version of the common model with the merged parameters.

At 214, a check can be performed to determine if a stopping criterion has been reached. That is, each of the nodes evaluate the model with the updated parameter values using their local data to calculate various validation metrics. The values obtained from this operation are shared using a smart contract state variable. As each node completes this step, it signals to the swarm learning network that the update and validation step is complete. In the interim, the merge leader may keep checking for an update complete signal from each node. When it discovers that all merge participants have signaled completion, the merge leader merges the local validation metric numbers to calculate global metric numbers. This updating of the model can be thought of as a synchronization step. If the policy decided during initialization supports monetization during model building, the rewards corresponding to the contributions by each of the participants are calculated and dispensed at this point. Afterwards, the current state of the swarm learning network is compared against a stopping criterion, and if it is found to be met, the swarm learning process ends. Otherwise, the steps of local model training, parameter sharing, parameter merging, and stopping criterion check are repeated until the criterion is fulfilled.

Figure 2B:
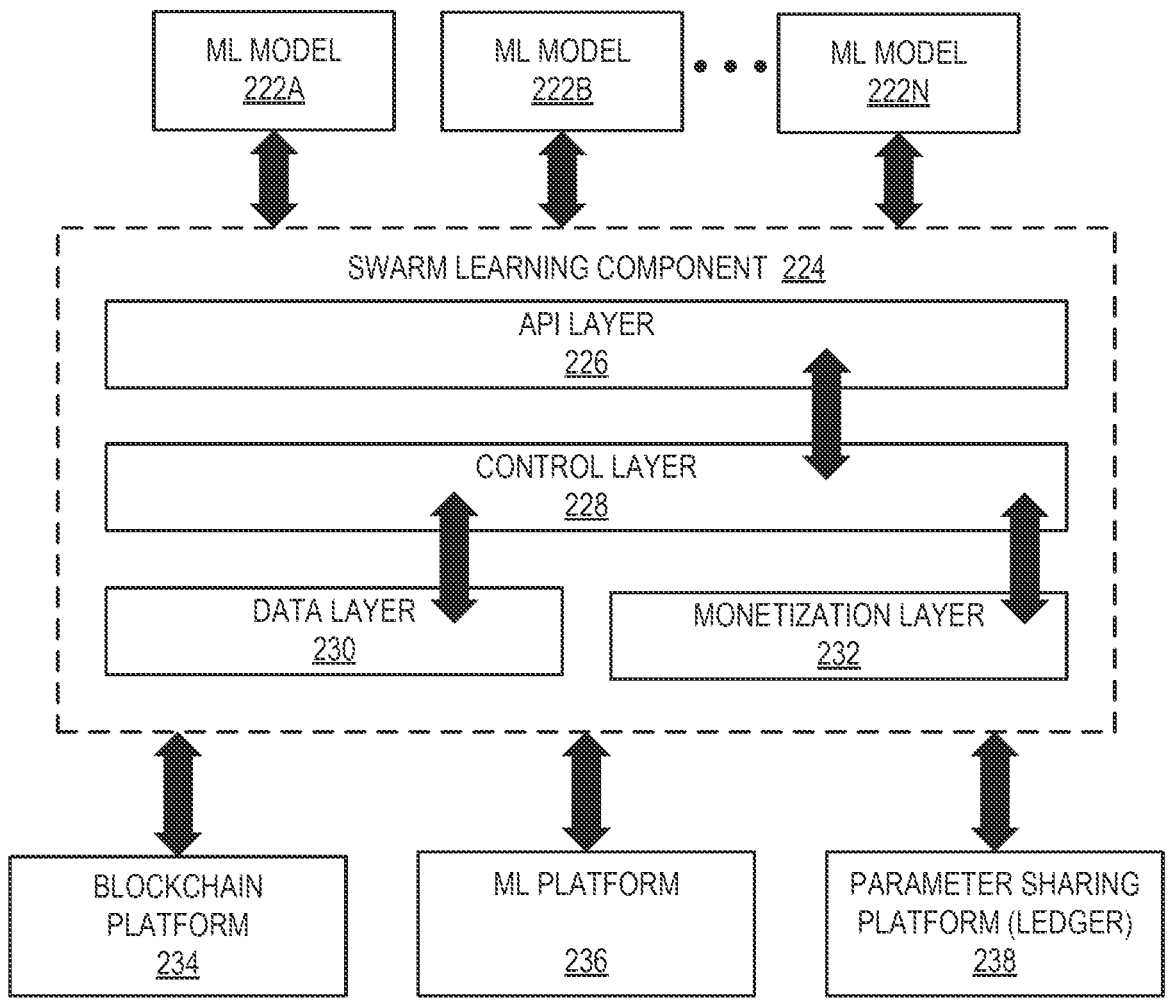
FIG. 2B illustrates example stages and operational flow of swarm learning in accordance with an embodiment of the disclosed technology.

FIG. 2B illustrates an example swarm learning architecture 220. This swarm learning architecture 220 may include local ML models 222A-222N at each node (ML models 1, 2, . . . N). These local ML models 222A-222N may be maintained and trained at nodes making up the swarm learning network, e.g., edge nodes 10, described above that make up blockchain network 110. The swarm learning architecture 220 may also include a swarm learning component 224 which may include an API layer 226, a control layer 228, a data layer 230, and a monetization layer 232. The swarm learning component 224 may operate (as noted above) in a blockchain context to ensure data privacy where a blockchain platform 234 operates on top of a ML platform 236 (that is distributed amongst nodes of a swarm learning network). The sharing of parameters can be performed using a blockchain ledger 238, which may be an embodiment of distributed ledger 42. It should be noted the components or elements of swarm learning architecture 220 can be modular so that the technologies used in implementing them can be replaced, adjusted, adapted, etc. based on requirements. The entire framework is designed to run on both commodity and high-end machines, supporting a heterogeneous set of infrastructure in the swarm learning network. It can be deployed within and across data centers, and has built-in support for a fault-tolerant network, where nodes can exit and reenter the swarm learning network dynamically without derailing or stalling the model building process. In other words, blockchain platform 234 is used as an infrastructure component for implementing a swarm learning ledger (or blackboard) which encompasses the decentralized control logic for ML model building, HE key sharing, and parameter sharing logic. Edge nodes 10 (where ML models 222A, 222B . . . , 222N are trained) may themselves have all the infrastructure components and control logic used for controlling/managing swarm learning.

Swarm learning, in one embodiment, can be implemented as an API library 226 available for multiple popular frameworks such as TensorFlow, Keras, and the like. These APIs provide an interface that is similar to the training APIs in the native frameworks familiar to data scientists. Calling these APIs automatically inserts the required "hooks" for swarm learning so that nodes seamlessly exchange parameters at the end of each model training epoch, and subsequently continue the training after resetting the local models to the globally merged parameters.

Responsibility for keeping the swarm learning network in a globally consistent state lies with the control layer 228, which is implemented using blockchain technology. The control layer 228 ensures that all operations and the corresponding state transitions are performed in an atomic manner. Both state and supported operations are encapsulated in a blockchain smart contract. The state (38 of FIG. 1D) comprises information such as the current epoch, the current members or participants of the swarm learning network, along with their IP addresses and ports, and the URIs for parameter files. The set of supported operations includes logic to elect a merge leader of the swarm learning network toward the end of each epoch, fault-tolerance, and self-healing mechanisms, along with signaling among nodes for commencement and completion of various phases.

Data layer 230 controls the reliable and secure sharing of model parameters across the swarm learning network. Like control layer 228, data layer 230 is able to support different file-sharing mechanisms, such as hypertext transfer protocol secure (HTTPS) over transport layer security (TLS), interplanetary file system (IPFS), and so on. Data layer 230 may be controlled through the supported operations invoked by control layer 228, where information about this layer may also be maintained.

Monetization layer 232 meters data usage and participant contribution (of data) during the model training process to calculate (appropriate) monetary rewards, which can be dispensed at the end of model training. It may rely on a blockchain smart contract as well to keep track of participant contributions, and the built-in cryptocurrency framework to transfer rewards to participants in an automated fashion.

Figure 3:
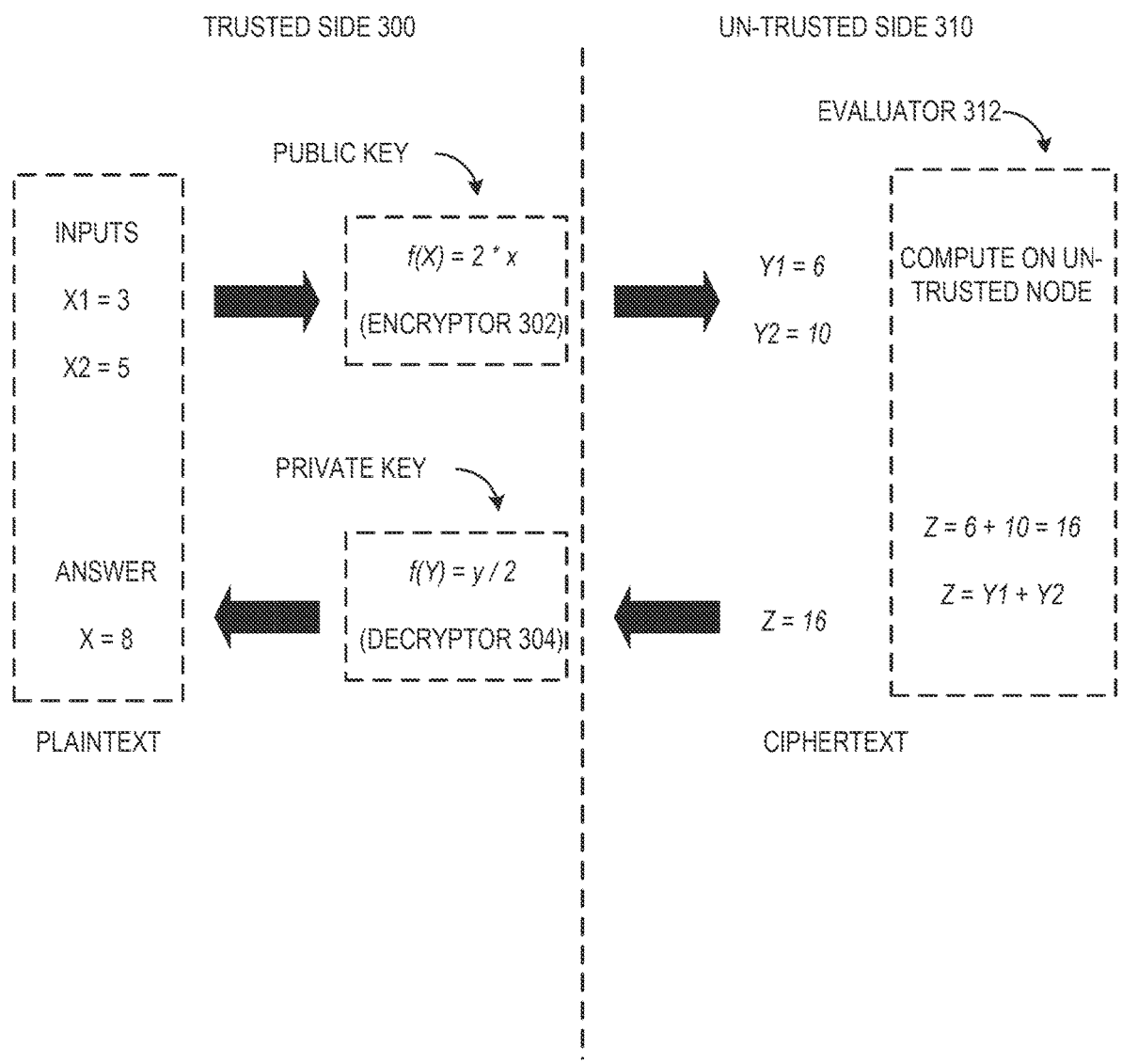
FIG. 3 illustrates an example of homomorphic encryption.

As noted above, homomorphic encryption can be the basis for swarm learning in accordance with various embodiments. FIG. 3 illustrates an example of homomorphic encryption. Homomorphic Encryption (HE) can refer to a subset of techniques to implement a trusted computing environment by allowing particular computations to be executed on ciphertexts, obtain an encrypted result that is the ciphertext of the result of operations performed on the plaintext. Here, the trusted side 300 includes encrypting with an encryptor 302, plaintext input values, using an encryption function, as well as decrypting with a decryptor 304, ciphertext received from the un-trusted side 310 using a private key resulting in a plaintext answer. Here, asymmetric key encryption, i.e., the use of private and public keys, can be leveraged to avoid sharing a common secret with any of the participants. In addition, HE may rely on an evaluator 312 (in un-trusted side 310) that executes evaluations operations, e.g., a pre-defined and proven set of operations such as addition, multiplication, etc. on homomorphically encrypted data. That is, evaluator 312 may receive encrypted versions of the plaintext input values, and perform the operation in ciphertext, in this case, addition. Because evaluator 312 operates only on encrypted data (ciphertext), evaluator 312 can be run on a non-trusted system, i.e., on the un-trusted side 310.

As alluded to above, various embodiments are directed to preventing any participant/node in the swarm learning network from gaining access to all of the parameter data in plaintext, or all of the shared secrets at any point in the parameter merging process, ensuring that even a merge leader cannot decrypt incoming parameter data. Further, the asymmetric keys will be generated by a key manager (external to the swarm learning network). The key manager is not part of the swarm learning "core" architecture (but rather a service relied upon to implement swarm learning). The key manager can be an enterprise grade key manager that generates and serves public/private keys from a fault tolerant and physical secure environment. For example, a key manager may be specialized and hardened hardware/software co-designed applications. As noted above, the key manager releases only the public key to the merge leader to be published to participants for encrypting their local parameter data, and parameter merging is performed homomorphically. Decryption of merged parameters can be executed by an elected decryptor node that is not the merge leader. This decryptor node can request a private key from the key manager to decrypt the merged parameters and supply it to the merge leader for distribution.

FIGS. 4A-4F illustrate example operations that can be performed to effectuate swarm learning using homomorphic encryption to protect parameter data in accordance with one embodiment of the disclosed technology.

Figure 4A:
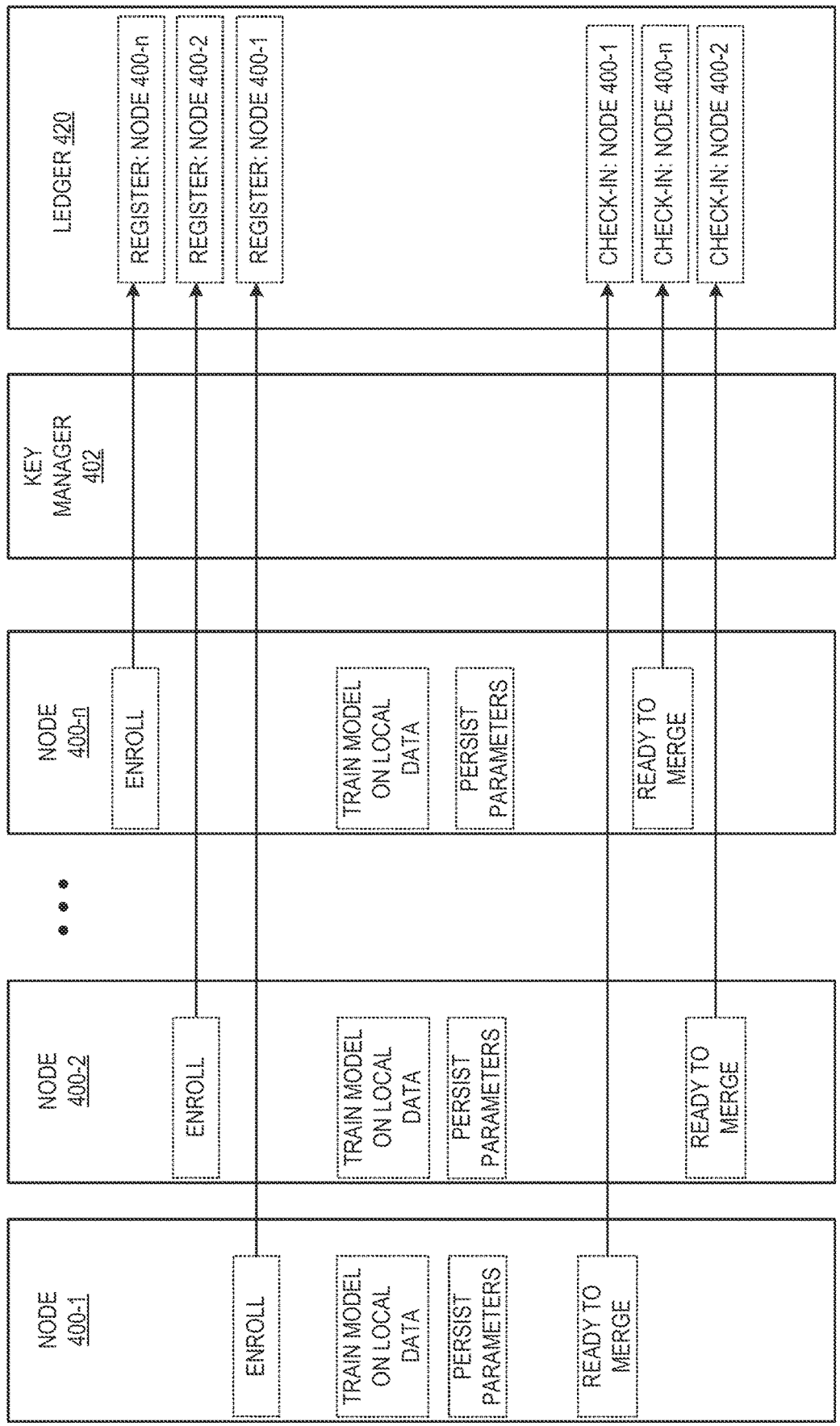
FIG. 4A illustrates example operations performed in a distributed blockchain network for electing a merge leader in accordance with an embodiment of the disclosed technology.

Referring to FIG. 4A, the swarm learning process may, in one embodiment, begin with the election of a merge leader when a quorum of nodes (nodes 400-1 to 400-n in the swarm network, which can be an embodiment of blockchain network 110, are ready merge their parameters. As illustrated in FIG. 4A, each of nodes 400-1, 400-2 . . . , 400-n perform an enroll operation resulting in each of nodes 400-1, 400-2 . . . , 400-n being registered in ledger 420, which may be an embodiment of ledger 42 or ledger 238 discussed above. It should be understood that the smart contracts 44, described above, may encode rules for enrolling a node for participation in a swarm learning network, e.g., an embodiment of blockchain network 110. The rules may specify required credentials and/or other enrollment prerequisites. The required credentials may impose permissions on which nodes are allowed to participate. For example, the blockchain network 110 may be configured as a private blockchain where only authorized nodes are permitted to participate in an iteration. Moreover, any authorization information and expected credentials may be encoded within the smart contracts 44 or other stored information available to nodes on the blockchain network 110. Once a node has been enrolled, the blockchain network 110 may record an identity of the node and its state so that an identification of all nodes is known. Such recordation may be made via an entry in the distributed ledger 420. As such, the distributed ledger 420 may record a topology of the nodes and a state of the nodes, and this may continue through the parameter merging process as will be described further below.

As further illustrated in FIG. 4A, each of nodes 400-1, 400-2 . . . , 400-n can train instances of a common, global model using local data present/contributed by each of the nodes. As noted above, parameters, e.g., weights, can be derived pursuant to the training of the model using local data, and these parameters may then be persisted in their encrypted state or format. Upon completion of model training and persisting the parameters derived therefrom, each of nodes 400-1, 400-2 . . . , 400-n are ready to merge their particular parameters with those of the other nodes. Accordingly, this ready to merge state may be reflected in ledger

420 by writing to ledger 420, a checked-in entry associated with each of nodes 400-1, 400-2 . . . , 400-$n$.

Figure 4B:
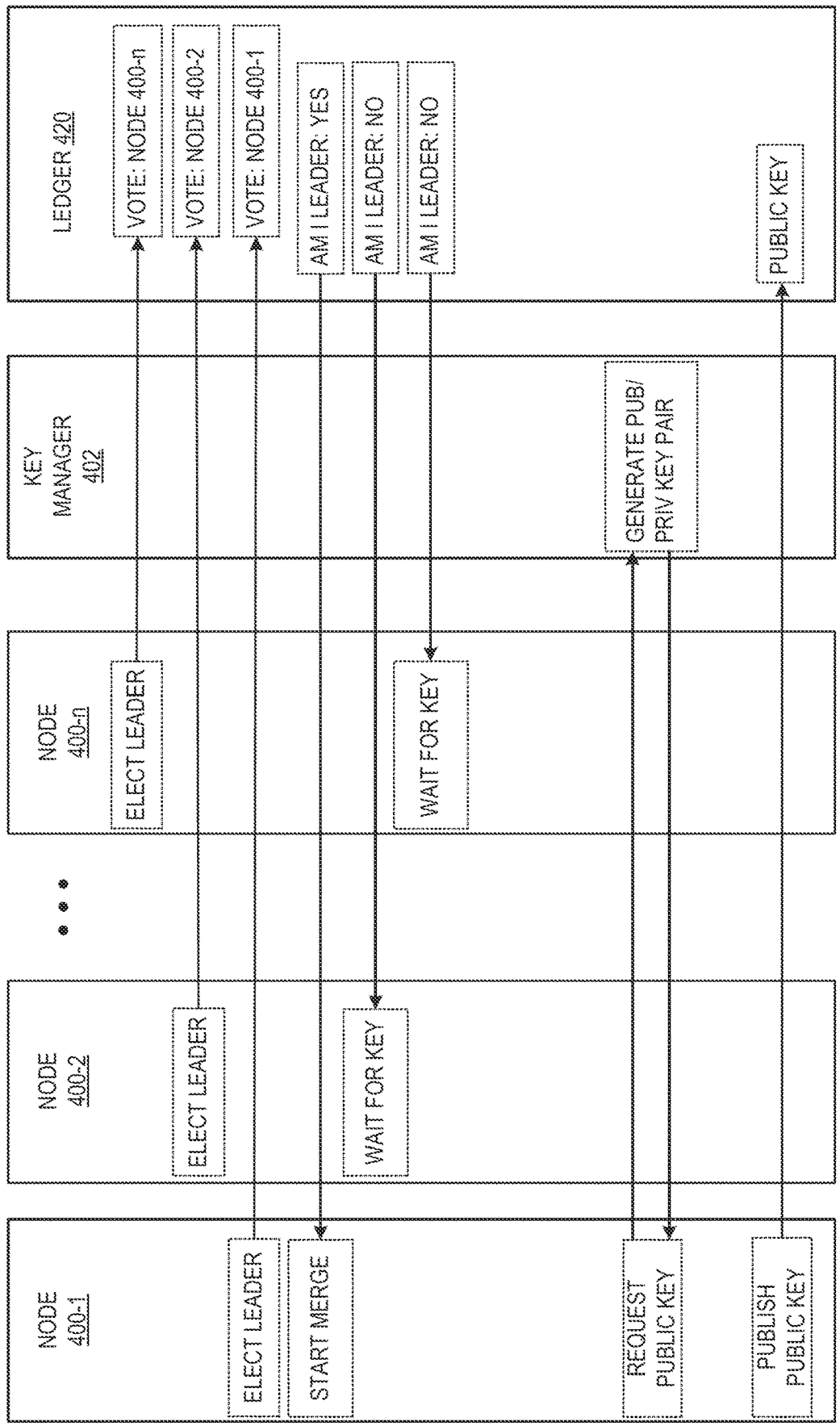
FIG. 4B illustrates example operations performed in a distributed blockchain network for requesting and publishing a public key in accordance with one embodiment of the disclosed technology.

Referring to FIG. 4B, each of nodes 400-1, 400-2 . . . , 400-$n$ go through an election process to select one of the nodes to act as a merge leader. Election votes are recorded in ledger 420. As noted above, ledger 420 can reflect a record of a node's state as well as its identity, so votes can be associated with the nodes submitting those votes, and a node selected, in this example, to be a merge leader (and later, a decryptor) can be made aware of its state/elected role. In some embodiments, each node uses agreed-upon voting/election logic, the winner of which is elected as the merge leader. For example, each node may randomly select a number that it registers in ledger 420, and the node registering the lowest number (or highest number, or closest to a defined number, etc.) can be used as a basis for election. Those having ordinary skill in the art would be aware of different election mechanism that can be implemented in this context. Once votes are recorded in ledger 420, each of nodes 400-1, 400-2 . . . , 400-$n$ queries ledger 420 to determine if it has been selected to be the merge leader. In this example, node 400-1 happens to have been selected, at which point, it may start the parameter merging process by first asking key manager 402 to generate a public/private key pair. Upon generating the requested public/private key pair, key manager transmits the public key to node 400-1. In the meantime, each of the other nodes, nodes 400-2 to 400-$n$ enter into a wait state until the public key generated by key manager 402 is published to ledger 420 by node 400-1, elected to be the merge leader. In some embodiments, the merge leader may signal to the other nodes that the public key has been published. In the present disclosure, the signaling may be accomplished by invoking methods in smart contracts that alter a common shared state in ledger 420.

Figure 4C:
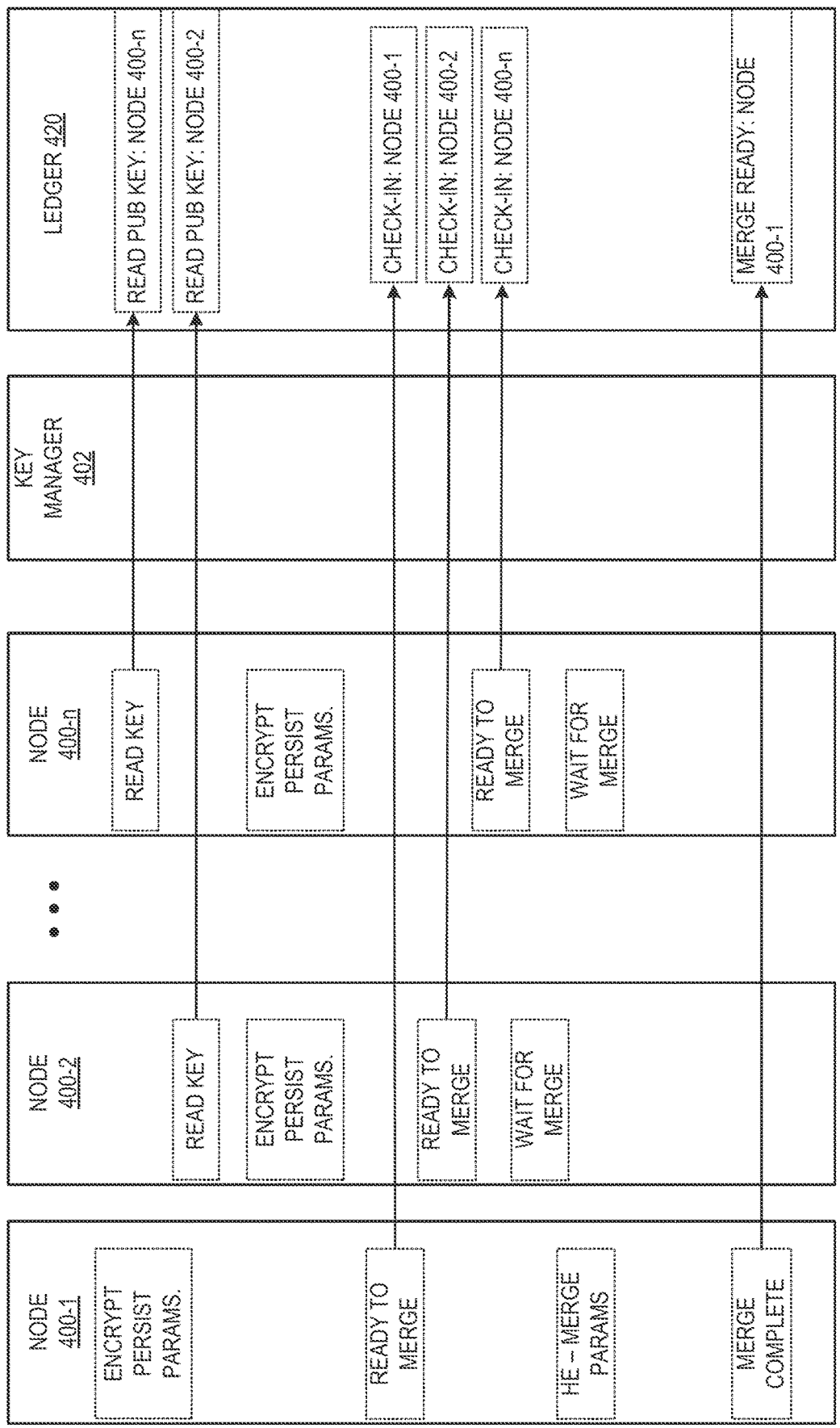
FIG. 4C illustrates example operations performed in a distributed blockchain network for decentralized parameter encryption and homomorphic merging of the decentralized parameters in accordance with one embodiment of the disclosed technology.

Referring now to FIG. 4C, each of nodes 400-1, 400-2 . . . , 400-$n$ encrypts its persisted parameters using the public key generated by key manager 402 and published by the elected merge leader, which in this example, is node 400-1. The reading of the public key by each of nodes 400-2 . . . , 400-$n$ may be written to ledger 420. It should be understood that because node 400-1 was elected to be the merge leader, and because key manager 402 responded to a public/private key request from node 400-1 by transmitting the generated public key to node 400-1, node 400-1 is already in possession of the public key.

As described above with respect to FIG. 3, an encryptor, such as encryptor 302, may be a complex function, and the public key becomes a parameter of that complex function, hence the ability to derive a parameter based on training the common, global model at each node. It should be understood that X1 and X2 can be equated to plaintext parameters sent by an individual node. Y1 and Y2 are encrypted parameters, and Z refers to a merged parameter derived by performing a homomorphic addition operation (adding Y1 and Y2). Z is also encrypted and is eventually decrypted to obtain the final merged parameter X. Upon each of nodes 400-1, 400-2 . . . , 400-$n$ completing their respective parameter encryption processes, each of nodes 400-1, 400-2 . . . , 400-$n$ writes their status, i.e., ready to merge state, to ledger 420. Ledger 420 records this as a check-in, similar to when each of the nodes 400-1, 400-2 . . . , 400-$n$ indicates readiness to merge their respective persisted parameters prior to encryption. Because in this example, node 400-1 is acting as the merge leader, nodes 400-2 . . . , 400-$n$ enter into a "wait for merge" state until node 400-1 is ready to perform the (encrypted) parameter merging. In some embodiments, nods 400-2 . . . , 400-$n$ signal their respective readiness to merge to node 400-1. When all the remaining nodes, in this example, nodes 400-2 . . . , 400-$n$ are ready to merge, node 400-1 downloads the encrypted, persisted parameters from each of nodes 400-2 . . . , 400-$n$ and performs the merge to arrive at a final merged parameter, and when the merge is complete, node 400-1 writes to ledger 420 that the merged parameter is ready. As used herein, a merge, such as parameter merge can refer to a mathematical weighted averaging operation that outputs a single parameter derived through this mathematical weighted averaging operation based on input parameters.

With regard to nodes providing their respective state, each node may record its own state in ledger 420. For example, a node, such as node 400-2 recording the fact that it has read the public key published by the merge leader, i.e., node 400-1, provides an indication to the other nodes that a particular operation (in this case reading of the public key) was performed, and if so, whether it was successfully performed. Node 400-2 may write its state to a transaction that is shared to other nodes in the blockchain network 110 using the blockchain API 32. The management node 12 may obtain the transactions and mine them into the distributed ledger 420 using the blockchain API 32. Doing so creates an undisputable, tamperproof provenance of the global state of the blockchain network 110, which, as used herein, reflects the global state of the parameter/merging/swarm learning status amongst nodes 400-1, 400-2 . . . , 400$n$. Moreover, each node is aware of the full state of the swarm learning network from their local copy of the distributed ledger 420. This allows any node to take globally valid decisions based on local data, as well as scale to add new nodes or account for restarting nodes that need to synchronize to the current state of the swarm learning network.

It should be understood that the above-described phase ensures full protection of the local, node-specific parameters prior to them being merged. Also, by distributing the compute-intensive encryption process to each of the participating nodes, scaling bottlenecks are avoided. Furthermore, the algorithm ensures complete data privacy as none of the nodes including the merge leader will ever have parameters from another peer in plaintext. It should also be noted that the aforementioned, final merged parameter comprises a homomorphic summation of the individual, encrypted and persisted parameters, which is then followed by a scalar multiplication with a 1/QuorumSize floating point constant. Since the merge process uses basic homomorphic operators, this algorithm can be implemented with most any existing/available HE package. It should be understood that HE schemes typically only allow certain types of mathematical operations to be performed on data. For example, many popular ME schemes have addition and scalar multiplication defined. Therefore, for simplicity/efficiency, parameter merging as described herein can be made to rely on these basic operations. In other words, known HE schemes can be leveraged without altering their logic. Since the merge process uses basic homomorphic operators, this algorithm can be implemented with most any existing/available HE scheme or package, e.g., RSA, ElGamal, Goldwasse-Micali, etc. Once the merge operation is done the merge leader signals other nodes that the merged parameter as ready for decryption.

Figure 4D:
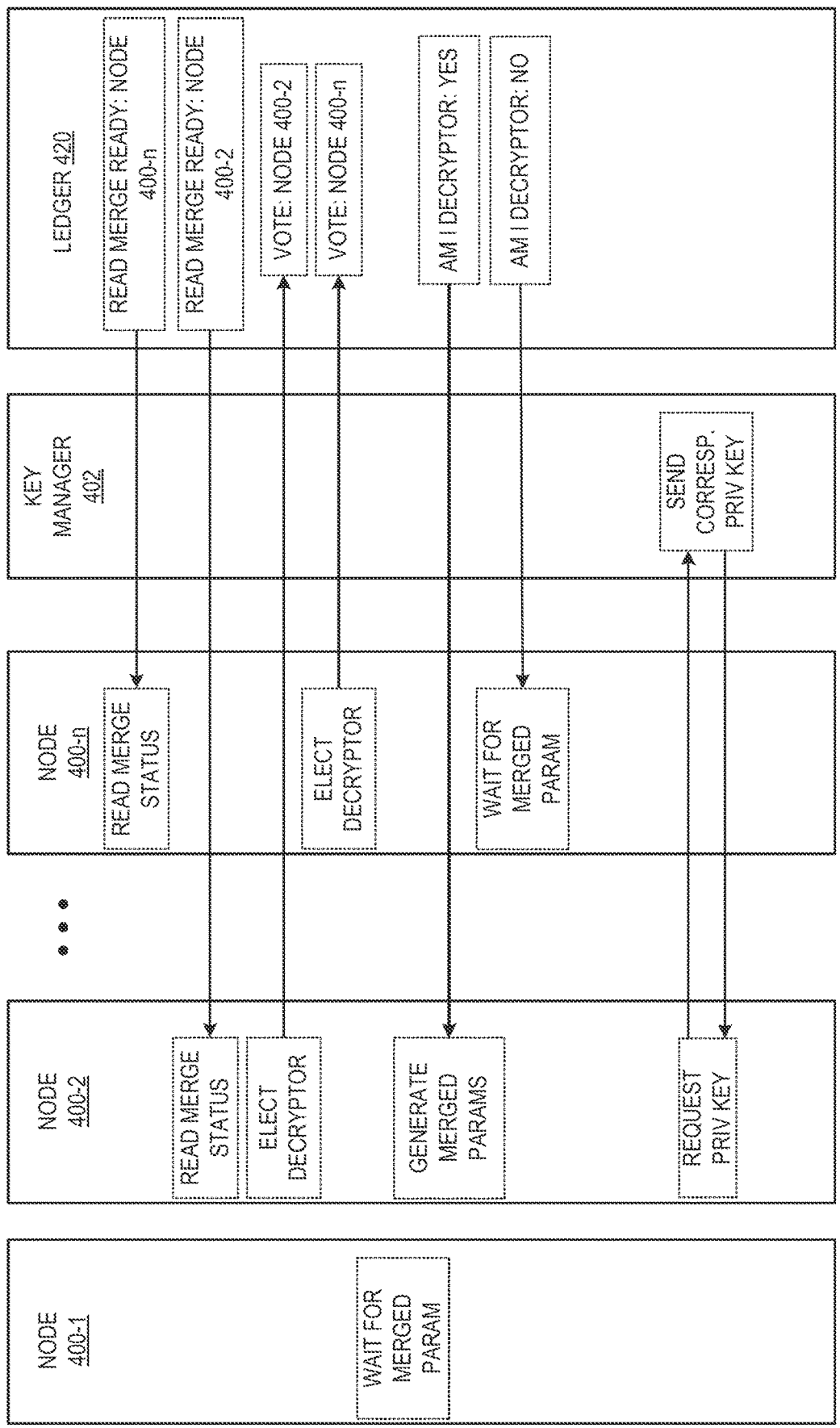
FIG. 4D illustrates example operations performed in a distributed blockchain network for electing a decryptor that is not the merge leader in accordance with one embodiment of the disclosed technology.

Referring now to FIG. 4D, each node (other than the merge leader, node 400-1), upon reading the merge ready signal recorded in ledger 420, engages in a decryptor election process. As illustrated in FIG. 4D, the reading of the merge ready signal may also be recorded by ledger 420, and similar to the election process described above for electing the merge leader, a decryptor is elected. Votes for a particular node to act as the decryptor are written to ledger 420. The merge leader, node 400-1 in this example, is purposely excluded from the decryptor election process to ensure it cannot be selected so that it will not be privy to the private key used to decrypt the final merged parameter. Recall that part of the security afforded by various embodiments of the disclosed technology is premised on the fact that no one participant or node knows both the public and private keys. In this example, node 400-2 has been elected to act as the decryptor, and once this election occurs, the remaining nodes enter a "wait for merged parameter" state. The decryptor, in this case, node 400-2, requests the private key generated by key manager 402 in response to the previous request from the merge leader, node 400-1. Key manager 402 responds to node 400-2 by sending the corresponding private key to node 400-2. Again, node 400-1, which has/had the public key used for encrypting will not be privy to the corresponding private key, preventing node 400-1 from decrypting any parameter data. Moreover, node 400-2, the decryptor is not privy to any other local parameters or parameter data from any other nodes because node 400-1 was the elected merge leader. Node 400-2 generates the merged parameter by decrypting Z (the encrypted version of the merged parameters) that is converted to X (the decrypted version of the merged parameter).

Figure 4E:
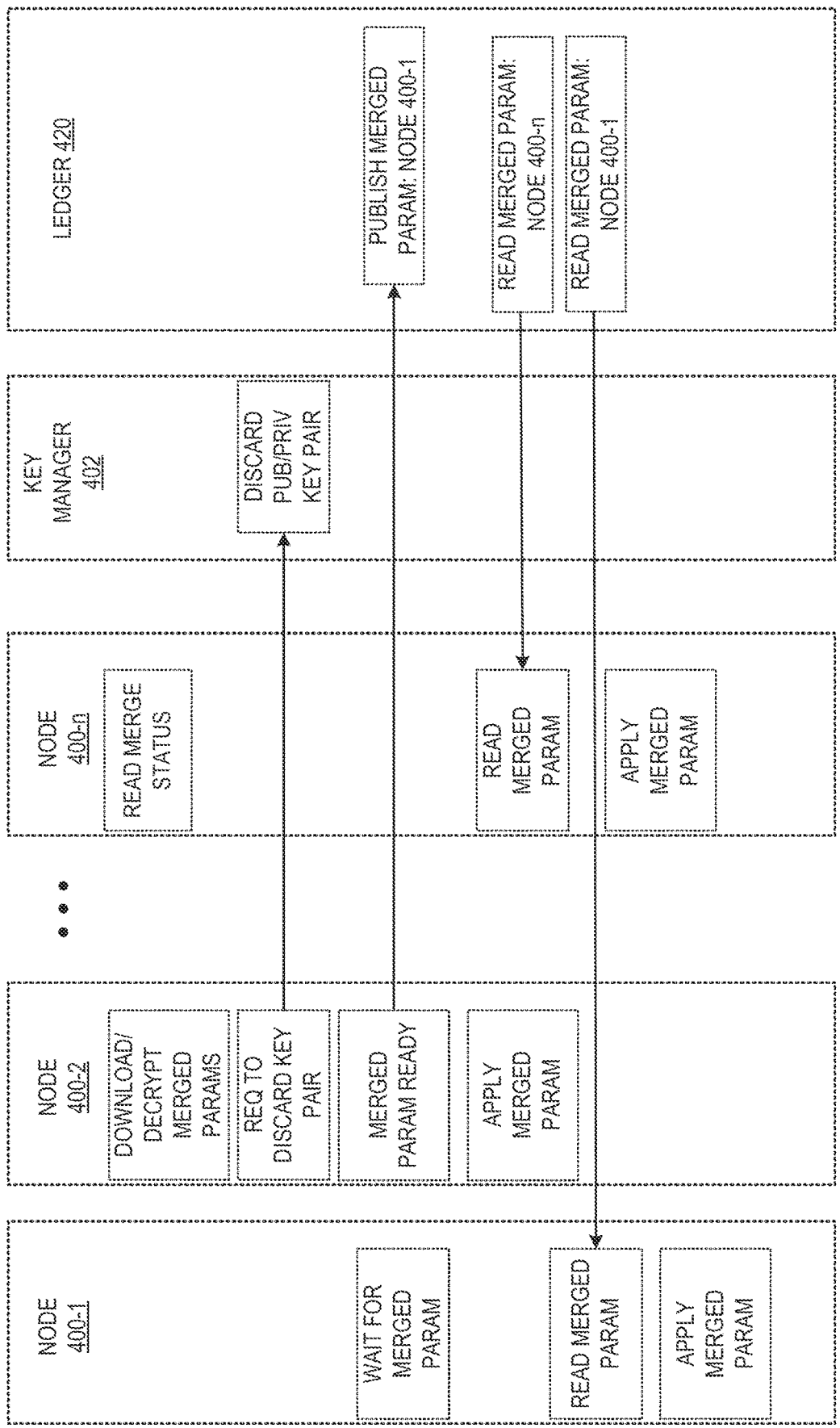
FIG. 4E illustrates example operations performed in a distributed blockchain network for distribution of the merged decentralized parameters in accordance with one embodiment of the disclosed technology.

Referring to FIG. 4E, the decryptor, i.e., node 400-2, downloads the merged parameter from the merge leader, i.e., node 400-1, decrypts the merged parameter, and uploads the now-decrypted merged parameter back to the merge leader, and requests that key manager 402 discard the public/private key pair permanently. Key manager 402 in response, discards the public/private key pair. This ensures that no other nodes, including the merge leader, can request the private key to decrypt the parameters from another node. The decryptor signals the merge parameter is ready and is available with the merge leader as evidence by ledger 420 being updated to record the transaction of uploading/publishing of the decrypted, merged parameter by node 400-1. In other words, upon uploading the decrypted, merged parameter to the merge leader (node 400-1), the merge leader makes the decrypted, merged parameter available to the other nodes. The remaining nodes, other than node 400-2 (because it is already aware of the merged parameter) read the merged parameter by downloading it from node 400-1. All the nodes 400-1, 400-2 . . . , 400-n may now apply the merged parameter locally to their respective local instances of the common, global model. It should be understood that application of a merged parameter can refer to overwriting parameters that were externally supplied, in this case, the final merge parameter overrides the local parameters at each of nodes 400-1, 400-2 . . . , 400-n.

Figure 4F:
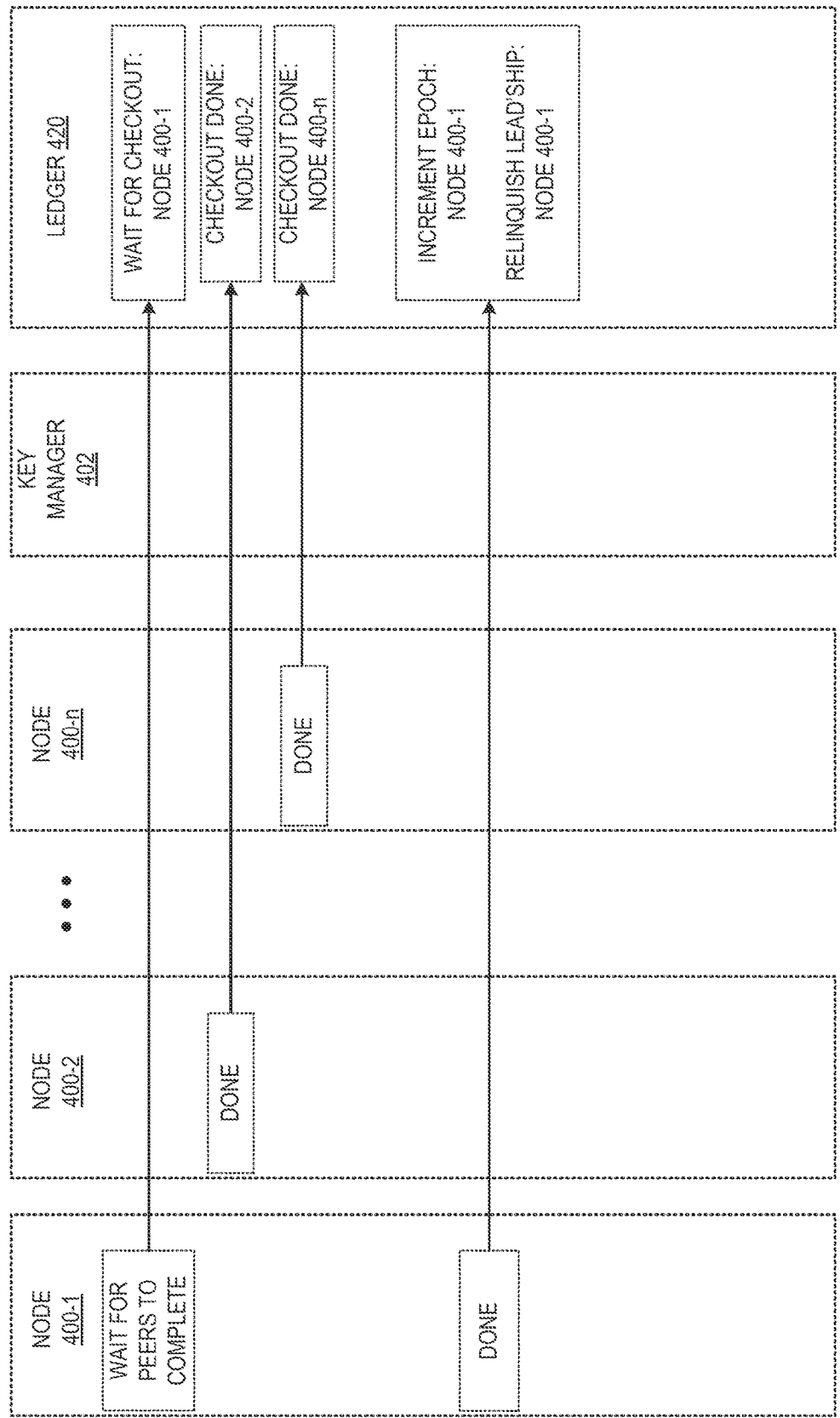
FIG. 4F illustrates completion of the decentralized parameter merging in accordance with one embodiment of the disclosed technology.

As illustrated in FIG. 4F, node 400-1 waits for the other nodes to complete application of the merged parameter to their respective local instances of the common, global model, which can be reflected in ledger 420. When all the nodes are done applying the merged parameter, the nodes may also signal completion in ledger 420, at which point, node 400-1, the merge leader, records an increment to the epoch number/value and relinquishes its role as the merge leader. As noted above, this parameter merging process can be repeated until the swarm learning network is able to converge the global model to a desired accuracy level.

Figure 5:
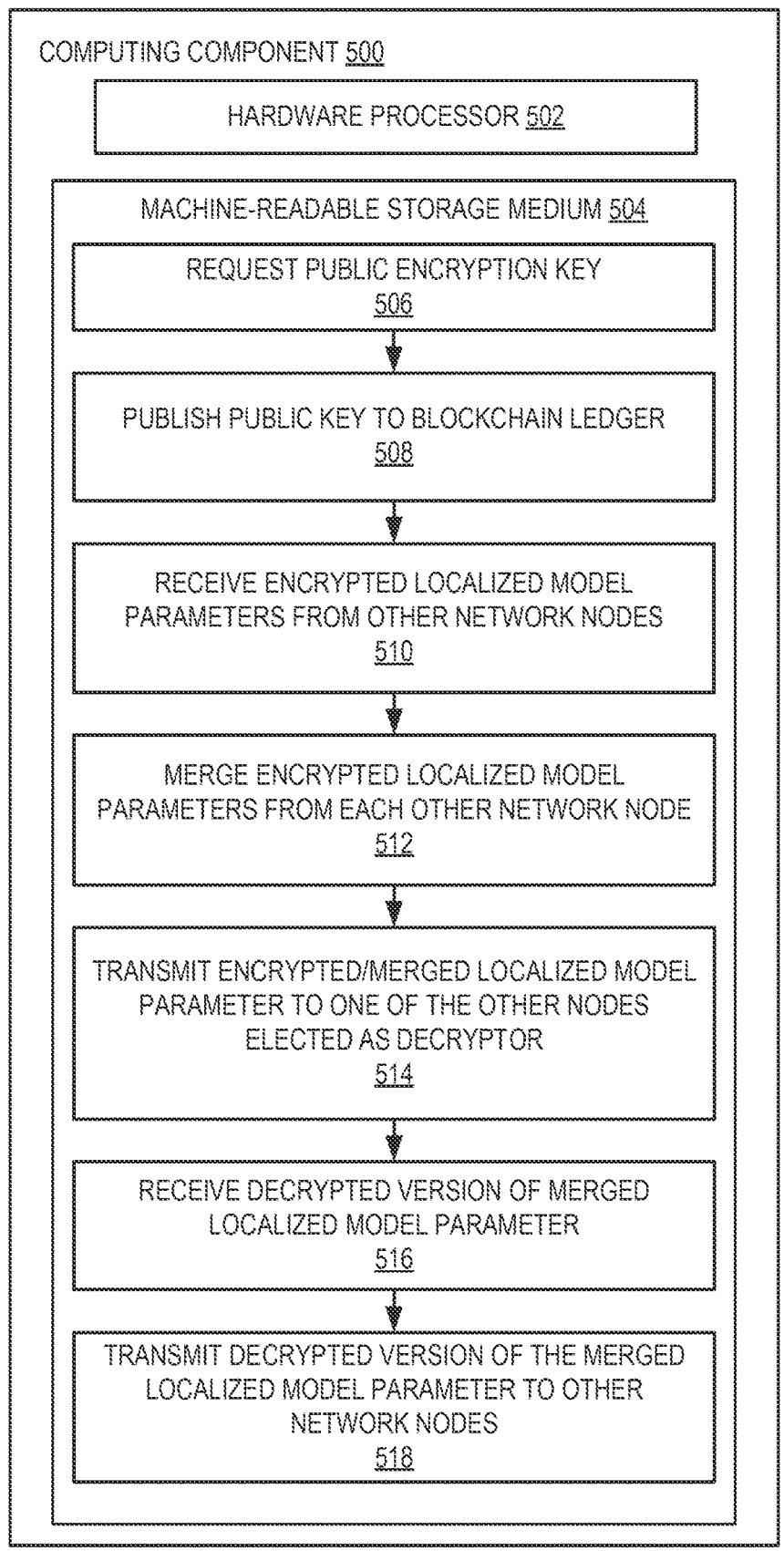
FIG. 5 is an example computing component that may be used to implement various features of an elected merge leader in accordance with one embodiment of the disclosed technology.

FIG. 5 is an example computing component 500 that may be used to implement various features of an elected merge leader in accordance with one embodiment of the disclosed technology. Computing component 500 may be, for example, a server computer, a controller, or any other similar computing component capable of processing data. In the example implementation of FIG. 5, the computing component 500 includes a hardware processor 502, and machine-readable storage medium 504. In some embodiments, computing component 500 may be an embodiment of processor 50 of edge node 10 (FIG. 1C).

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-518, to control processes or operations for merging local parameters to effectuate swarm learning in a blockchain context using homomorphic encryption. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-518.

Hardware processor 502 may execute instruction 506 to request a public encryption key. As described above, a node in a swarm learning network implemented atop a blockchain platform may be elected to be a merge leader that requests a separate and/or external key manager to generate a public/private key pair used to homomorphically encrypt parameter data local to individual nodes. Homomorphic encryption can be leveraged in some embodiments to protect the privacy of parameter data of nodes from other nodes in the event one or more of the nodes is attempting to subvert the decryption process.

Hardware processor 502 may execute instruction 508 to publish the public key to a blockchain ledger. Upon receipt of the public key generated by the key manager, the node elected to be the merge leader may distribute the public key to the other nodes in the swarm learning network so that the merge leader (being a node with its own parameter data) and each of the other nodes may encrypt their local parameter data used to train their respective local instances of a common, global ML model (to be later aggregated).

Hardware processor 502 may execute instruction 510 to receive encrypted localized model parameters from other network nodes, and may further execute instruction 512 to merge the encrypted localized model parameters from each other network node. As described above, the swarm learning framework is premised on distributed ML, where multiple nodes can be used to build local models using subsets of data available locally to each of the multiple nodes. Parameters representative of what each of the local models have learn by way of the local subsets of data can then be combined with that of other local models (at the other nodes) to derive a global model.

Hardware processor 502 may further execute instruction 514 to transmit the encrypted and merged localized model parameter to one of the other nodes elected as a decryptor. One mechanism used in various embodiments to keep any one node from having the ability to decrypt and obtain parameter data of other nodes, is to maintain separation between the node elected as the merge leader (and is privy to the public key of the public/private key pair) and the node that performs the decryption of parameter data. Accordingly, upon election of a decryptor node that cannot be the node elected as the merge leader, the merge leader sends the encrypted merged parameter to that decryptor so that the merged parameter can be applied to the local model at each node.

Accordingly, hardware processor 502 may execute instruction 516 to receive the decrypted version of the merged localized model parameter. That is, the merge leader (which itself is a node having its own local model to train) may receive the decrypted merged parameter to apply to the local model.

Hardware processor 502 may execute instruction 518 to transmit the decrypted version of the merged localized model parameter to other network nodes. For example, the decryptor may signal to the other nodes that the merged parameters is ready and available from the merge leader, at which point the nodes may download that merged parameters to be applied to their own local models.

Figure 6:
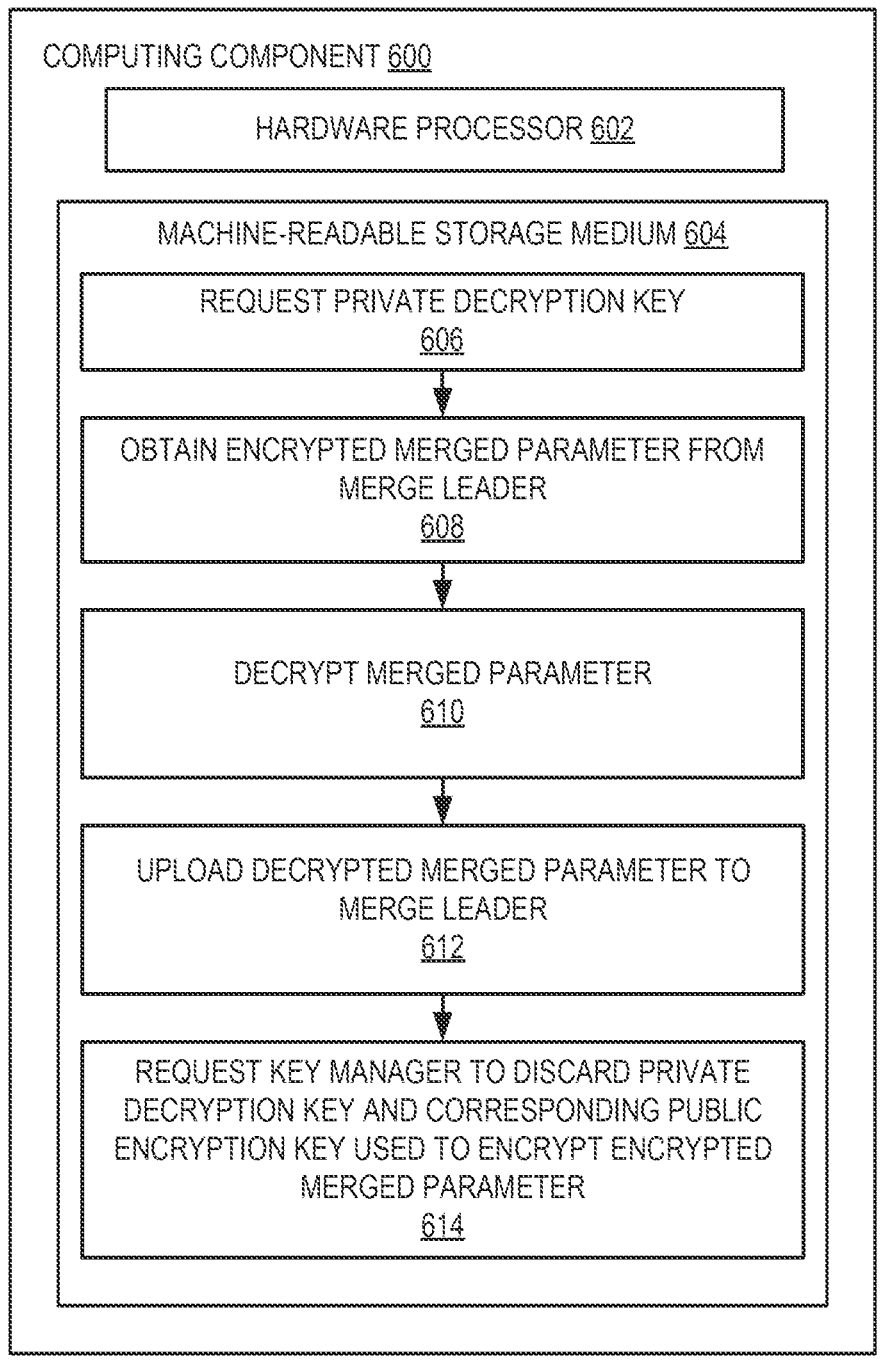
FIG. 6 is an example computing component that may be used to implement various features of an elected decryptor in accordance with one embodiment of the disclosed technology.

FIG. 6 is an example computing component 600 that may be used to implement various features of an elected decryptor in accordance with one embodiment of the disclosed technology. Computing component 600 may be, for example, a server computer, a controller, or any other similar computing component capable of processing data. In the example implementation of FIG. 6, the computing component 600 includes a hardware processor 602, and machine-readable storage medium 604. In some embodiments, computing component 600 may be an embodiment of processor 50 of edge node 10 (FIG. 1C).

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-614, to control processes or operations for merging local parameters to effectuate swarm learning in a blockchain context using homomorphic encryption. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-614.

Hardware processor 602 may execute instruction 606 to request a private decryption key. As mentioned above, various embodiments implement homomorphic encryption in a manner such that no one node is able to discern plaintext parameter data of another node. This is done to protect the swarm learning process from malicious tampering and/or to protect the privacy of the parameter data (and raw data from which it is derived). Accordingly, a node of the swarm learning network may be elected to act as a decryptor, where that elected node has not been previously elected to act as a merge leader (that as described above, obtains a public key corresponding to this private decryption key). That decryptor, in order to decrypt a merged parameter encrypted by the merge leader, requests the aforementioned private key to perform this decryption so that the merged parameter can be distributed to the other nodes to be applied to the other nodes' respective local instance of the common, global model being trained through swarm learning.

Hardware processor 602 may execute instruction 608 to obtain an encrypted merged parameter from a merge leader. As described above, separate nodes handle encryption and decryption of the merged parameter to protect against any malicious attacks and/or to protect the privacy of local parameter (and raw) data contributed to the swarm learning process by a node. Upon receiving the private key from the key manager, the decryptor can decrypt the merged parameter encrypted (using the public key) by the merge leader, which again, is a different elected node. Accordingly, hardware processor 602 may further execute instruction 610 to decrypt the merged parameter.

Hardware processor 602 may then execute instruction 612 to upload the decrypted merged parameter to the merge leader. In this way, the merge leader can make available, by publishing to the ledger of the swarm learning network, the merged parameter. The other nodes that have been in wait state (waiting to obtain the merged parameter to be applied to their respective local instance of the common, global model) can obtain the merged parameter.

To ensure that no other node can obtain the private key, especially the node elected to act as the merge leader, hardware processor 602 may execute instruction 614 to request the key manager to discard the private decryption key and the corresponding encryption public key used to encrypt the encrypted merged parameter. In some embodiments, the public/private key pair is discarded permanently to ensure keys cannot be "held back" or preserved and used to decrypt parameters from previous epochs for which those keys were generated. If for some reason, security can be relaxed, permanent deletion may not be necessary. Discarding keys permanently can involve various methods, e.g., methods similar to sanitizing data on physical memory, repeated writes of random patterns, etc. In some embodiments the method of discarding can be dependent on the key manager and/or how it operates.

Various embodiments of the disclosed technology are able to distribute computations for performing cryptographic operations to all participants in a near-uniform fashion. That is, all nodes participate in ML model training, contribute parameters to merge, etc., although some nodes, such as the merge leader node which performs merge functions or the decryptor that decrypts data perform operations are not performed by every node. Moreover, various embodiments employ a swarm learning/parameter merging process or algorithm that can be distributed across all participants of a blockchain network such that implementation can be easily scaled. Further still, implementation of the various embodiments provides a fault tolerant solution to ML and model training, despite the distributed, swarm learning aspect, where many operations are independently performed by edge nodes.

Figure 7:
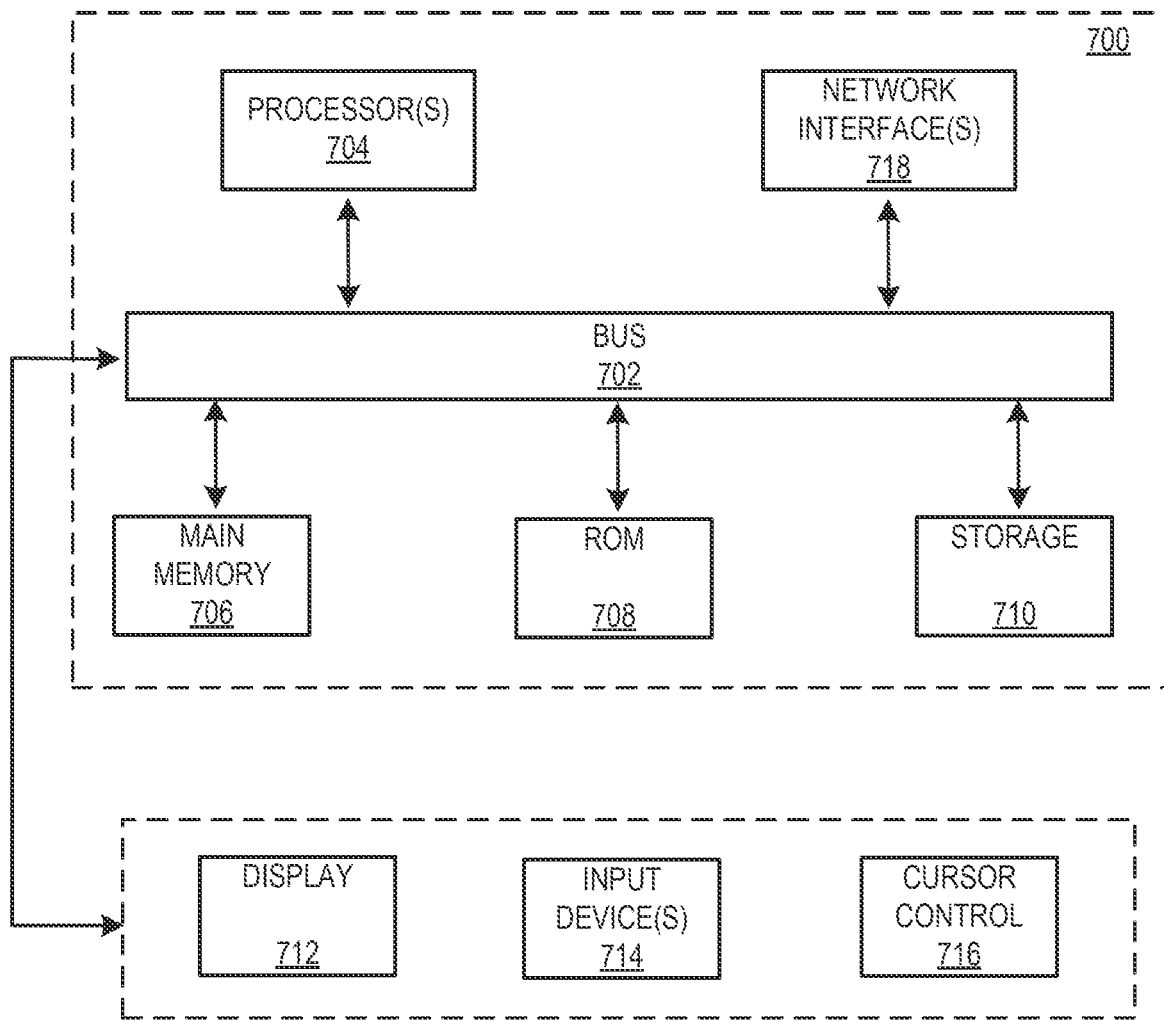
FIG. 7 is an example computing component that may be used to implement various features of embodiments of the present disclosure.

FIG. 7 depicts a block diagram of an example computer system 700 in which various embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit or component might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits or components described herein might be implemented as discrete circuits/components or the functions and features described can be shared in part or in total among one or more circuits/components. Even though various features or elements of functionality may be individually described or claimed as separate circuits/components, these features and functionality can be shared among one or more common circuits/components, and such description shall not require or imply that separate circuits/components are required to implement such features or functionality. Where a circuit/component is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
    requesting, in a distributed network including a network node, from a key manager of the distributed network, a public encryption key;
    publishing the public key to a blockchain ledger of the distributed network;
    receiving from a plurality of other network nodes of the distributed network, localized model parameters, the localized model parameters having been encrypted using the public key, and the localized model parameters having been derived from training a machine learning model common to the network node and the other network nodes using local training data present at each of the other network nodes;
    merging the encrypted localized model parameters from each of the other network nodes into a single encrypted merged model parameter;
    transmitting the single encrypted merged model parameter to one of the other network nodes, the one of the other network nodes having been elected to act as a decryptor,
    receiving, from the decryptor, a decrypted version of the single merged model parameter; and
    transmitting the decrypted version of the single merged model parameter to each of the other network nodes for application to refine the common machine learning model at each of the other network nodes.

2. The method of claim 1, further comprising: requesting the public encryption key executes the request upon election of the network node to act as a merge leader.

3. The method of claim 2, wherein the election of the network node to act as the merge leader occurs upon establishment of a quorum of the other network nodes being ready to merge their respective localized model parameters as reflected in respective node check-in entries in the blockchain ledger.

4. The method of claim 1, wherein the key manager comprises an entity external to the blockchain network.

5. The method of claim 1, further comprising: signaling, by writing to the blockchain ledger, completion of the merging of the encrypted localized model parameters from each of the other network nodes into the single encrypted merged model parameter.

6. The method of claim 1, further comprising: reading the published public key to perform encryption of the localized model parameters respectively maintained at each of the other network nodes.

7. The method of claim 6, further comprising: submitting, by the other network nodes, votes reflected in the blockchain ledger, to complete election of the decryptor.

8. The method of claim 7, wherein the election of the decryptor excludes the network node from being considered and from participating in the election of the decryptor.

9. The method of claim 7, further comprising: requesting, by one of the other network nodes elected as the decryptor, a private decryption key from the key manager, the private decryption key corresponding to the public encryption key.

10. The method of claim 9, wherein the memory unit of the one of the other network nodes elected to act as the decryptor further comprises computer code to request the key manager to permanently discard the public encryption key and the private decryption key.

11. The method of claim 1, further comprising: waiting for application of the single merged parameter to each of the other network nodes' respective machine learning models.

12. The method of claim 11, further comprising: incrementing an epoch counter upon completion of the application of the single merged parameter to each of the other network nodes' respective machine learning models.

13. The method of claim 11, wherein the distributed network comprises a swarm learning platform overlaid on a blockchain network comprising the network node and the other network nodes.

14. The method of claim 12, further comprising relinquishing its status as the merge leader.

15. The network node of claim 13, wherein the swarm learning platform is locally implemented at each of the network node and the other network nodes.

* * * * *